(12) United States Patent
Venkataraghavan et al.

(10) Patent No.: US 8,677,023 B2
(45) Date of Patent: Mar. 18, 2014

(54) HIGH AVAILABILITY AND I/O AGGREGATION FOR SERVER ENVIRONMENTS

(75) Inventors: Vikram Venkataraghavan, Sunnyvale, CA (US); Ming Wong, San Jose, CA (US); Vipul Jain, Sunnyvale, CA (US); Cheng Tang, Saratoga, CA (US); Shreyas Shah, San Jose, CA (US); Jonathan Davar, Los Altos Hills, CA (US); Mike Dvorkin, Emopalo Hills, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1968 days.

(21) Appl. No.: 11/145,698

(22) Filed: Jun. 3, 2005

(65) Prior Publication Data

US 2013/0145072 A1 Jun. 6, 2013

Related U.S. Application Data

(60) Provisional application No. 60/590,450, filed on Jul. 22, 2004.

(51) Int. Cl.
*G06F 15/16* (2006.01)
(52) U.S. Cl.
USPC .......................................... 709/250; 709/200
(58) Field of Classification Search
USPC .......... 709/238, 250, 200; 370/216, 351–352; 710/1, 100, 105; 718/1
See application file for complete search history.

(56) References Cited

U.S. PATENT DOCUMENTS

| | | | |
|---|---|---|---|
| 5,621,913 A | 4/1997 | Tuttle et al. | |
| 5,754,948 A | 5/1998 | Metze | |
| 5,815,675 A | 9/1998 | Steele et al. | |
| 5,898,815 A | 4/1999 | Bluhm et al. | |
| 6,003,112 A | 12/1999 | Tetrick | |
| 6,145,028 A | 11/2000 | Shank et al. | |
| 6,247,086 B1 | 6/2001 | Allingham | |
| 6,253,334 B1 | 6/2001 | Amdahl et al. | |
| 6,308,282 B1 * | 10/2001 | Huang et al. | ........... 714/4.3 |
| 6,314,525 B1 * | 11/2001 | Mahalingham et al. | ..... 714/4.12 |
| 6,343,324 B1 | 1/2002 | Hubis et al. | |
| 6,377,992 B1 | 4/2002 | Plaza Fernández et al. | |
| 6,393,483 B1 * | 5/2002 | Latif et al. | ........... 709/226 |
| 6,418,494 B1 | 7/2002 | Shatas et al. | |
| 6,430,191 B1 * | 8/2002 | Klausmeier et al. | ........... 370/412 |
| 6,466,993 B1 | 10/2002 | Bonola | |

(Continued)

OTHER PUBLICATIONS

Figueiredo et al, "Resource Virtualization Renaissance", May 2005, IEEE Computer Society, pp. 28-31.

(Continued)

*Primary Examiner* — Joshua Joo
(74) *Attorney, Agent, or Firm* — Kilpatrick Townsend & Stockton LLP

(57) ABSTRACT

Methods and apparatus are provided for virtualizing port adapter resources such as network interface cards (NICs) used to connect servers to packet based networks. Resources are offloaded from individual servers onto a resource virtualization switch. Servers connected to the resource virtualization switch using an I/O bus connection share access to NICs. Redundancy can be provided using multipathing mechanisms implemented at individual servers or high availability mechanisms implemented at the resource virtualization switch. Switchover can occur between ports on the same port adapter, between ports on separate adapters, or between ports on separate resource virtualization switches.

11 Claims, 14 Drawing Sheets

(56) References Cited

U.S. PATENT DOCUMENTS

| | | |
|---|---|---|
| 6,470,397 B1 | 10/2002 | Shah et al. |
| 6,578,128 B1 | 6/2003 | Arsenault et al. |
| 6,594,329 B1 | 7/2003 | Susnow |
| 6,628,608 B1 * | 9/2003 | Lau et al. .................. 370/218 |
| 6,708,297 B1 | 3/2004 | Bassel |
| 6,725,388 B1 | 4/2004 | Susnow |
| 6,757,725 B1 | 6/2004 | Frantz et al. |
| 6,804,257 B1 | 10/2004 | Benayoun et al. |
| 6,823,458 B1 | 11/2004 | Lee et al. |
| 6,898,670 B2 | 5/2005 | Nahum |
| 6,931,511 B1 | 8/2005 | Weybrew et al. |
| 6,963,946 B1 | 11/2005 | Dwork et al. |
| 6,970,921 B1 | 11/2005 | Wang et al. |
| 7,046,668 B2 | 5/2006 | Pettey et al. |
| 7,093,265 B1 | 8/2006 | Jantz et al. |
| 7,096,308 B2 | 8/2006 | Main et al. |
| 7,103,064 B2 | 9/2006 | Pettey et al. |
| 7,103,888 B1 | 9/2006 | Cayton et al. |
| 7,111,084 B2 | 9/2006 | Tan et al. |
| 7,120,728 B2 | 10/2006 | Krakirian et al. |
| 7,127,445 B2 | 10/2006 | Mogi et al. |
| 7,143,227 B2 | 11/2006 | Maine |
| 7,159,046 B2 | 1/2007 | Mulla et al. |
| 7,171,434 B2 | 1/2007 | Ibrahim et al. |
| 7,171,495 B2 | 1/2007 | Matters et al. |
| 7,188,209 B2 | 3/2007 | Pettey et al. |
| 7,203,842 B2 | 4/2007 | Kean |
| 7,209,439 B2 | 4/2007 | Rawlins et al. |
| 7,213,246 B1 * | 5/2007 | van Rietschote et al. ......... 718/1 |
| 7,219,183 B2 | 5/2007 | Pettey et al. |
| 7,240,098 B1 | 7/2007 | Mansee |
| 7,260,661 B2 | 8/2007 | Bury et al. |
| 7,269,168 B2 | 9/2007 | Roy et al. |
| 7,281,030 B1 | 10/2007 | Davis |
| 7,281,077 B2 | 10/2007 | Woodral |
| 7,281,169 B2 | 10/2007 | Golasky et al. |
| 7,307,948 B2 | 12/2007 | Infante et al. |
| 7,308,551 B2 | 12/2007 | Arndt et al. |
| 7,334,178 B1 | 2/2008 | Aulagnier |
| 7,345,689 B2 | 3/2008 | Janus et al. |
| 7,346,716 B2 | 3/2008 | Bogin et al. |
| 7,360,017 B2 | 4/2008 | Higaki et al. |
| 7,366,842 B1 | 4/2008 | Acocella et al. |
| 7,386,637 B2 | 6/2008 | Arndt et al. |
| 7,412,536 B2 | 8/2008 | Oliver et al. |
| 7,421,710 B2 | 9/2008 | Qi et al. |
| 7,424,529 B2 | 9/2008 | Hubis |
| 7,433,300 B1 | 10/2008 | Bennett et al. |
| 7,457,897 B1 | 11/2008 | Lee et al. |
| 7,457,906 B2 | 11/2008 | Pettey et al. |
| 7,493,416 B2 | 2/2009 | Pettey |
| 7,502,884 B1 | 3/2009 | Shah et al. |
| 7,509,436 B1 | 3/2009 | Rissmeyer |
| 7,516,252 B2 | 4/2009 | Krithivas |
| 7,602,774 B1 | 10/2009 | Sundaresan et al. |
| 7,609,723 B2 | 10/2009 | Munguia |
| 7,634,650 B1 | 12/2009 | Shah et al. |
| 7,711,789 B1 | 5/2010 | Jnagal et al. |
| 7,782,869 B1 | 8/2010 | Chitlur Srinivasa |
| 7,783,788 B1 | 8/2010 | Quinn et al. |
| 7,792,923 B2 | 9/2010 | Kim |
| 7,793,298 B2 | 9/2010 | Billau et al. |
| 7,821,973 B2 | 10/2010 | McGee et al. |
| 7,836,332 B2 | 11/2010 | Hara et al. |
| 7,843,907 B1 | 11/2010 | Abou-Emara et al. |
| 7,849,153 B2 | 12/2010 | Kim |
| 7,870,225 B2 | 1/2011 | Kim |
| 7,933,993 B1 | 4/2011 | Skinner |
| 7,937,447 B1 | 5/2011 | Cohen et al. |
| 7,941,814 B1 * | 5/2011 | Okcu et al. .................. 719/324 |
| 8,041,875 B1 | 10/2011 | Shah et al. |
| 8,180,872 B1 | 5/2012 | Marinelli et al. |
| 8,180,949 B1 | 5/2012 | Shah et al. |
| 8,185,664 B1 | 5/2012 | Lok et al. |
| 8,195,854 B1 | 6/2012 | Sihare |
| 8,200,871 B2 | 6/2012 | Rangan et al. |
| 8,228,820 B2 | 7/2012 | Gopal Gowda et al. |
| 8,261,068 B1 | 9/2012 | Raizen et al. |
| 8,285,907 B2 | 10/2012 | Chappell et al. |
| 8,291,148 B1 | 10/2012 | Shah et al. |
| 8,392,645 B2 | 3/2013 | Miyoshi |
| 8,397,092 B2 | 3/2013 | Karnowski |
| 8,443,119 B1 | 5/2013 | Limaye et al. |
| 8,458,306 B1 | 6/2013 | Sripathi |
| 2001/0032280 A1 | 10/2001 | Osakada et al. |
| 2002/0023151 A1 | 2/2002 | Iwatani |
| 2002/0065984 A1 | 5/2002 | Thompson et al. |
| 2002/0069245 A1 | 6/2002 | Kim |
| 2002/0152327 A1 | 10/2002 | Kagan et al. |
| 2003/0007505 A1 | 1/2003 | Noda et al. |
| 2003/0028716 A1 | 2/2003 | Sved |
| 2003/0051076 A1 | 3/2003 | Webber |
| 2003/0081612 A1 | 5/2003 | Goetzinger et al. |
| 2003/0093501 A1 | 5/2003 | Carlson et al. |
| 2003/0099254 A1 | 5/2003 | Richter |
| 2003/0110364 A1 | 6/2003 | Tang et al. |
| 2003/0126315 A1 | 7/2003 | Tan et al. |
| 2003/0126320 A1 | 7/2003 | Liu et al. |
| 2003/0126344 A1 | 7/2003 | Hodapp, Jr. |
| 2003/0131182 A1 | 7/2003 | Kumar et al. |
| 2003/0172149 A1 | 9/2003 | Edsall et al. |
| 2003/0200315 A1 | 10/2003 | Goldenberg et al. |
| 2003/0208614 A1 | 11/2003 | Wilkes |
| 2003/0212755 A1 | 11/2003 | Shatas et al. |
| 2003/0226018 A1 | 12/2003 | Tardo et al. |
| 2003/0229645 A1 | 12/2003 | Mogi et al. |
| 2004/0003141 A1 * | 1/2004 | Matters et al. ................ 710/1 |
| 2004/0003154 A1 | 1/2004 | Harris et al. |
| 2004/0008713 A1 | 1/2004 | Knight et al. |
| 2004/0025166 A1 | 2/2004 | Adlung et al. |
| 2004/0030857 A1 | 2/2004 | Krakirian et al. |
| 2004/0034718 A1 | 2/2004 | Goldenberg et al. |
| 2004/0057441 A1 | 3/2004 | Li et al. |
| 2004/0078632 A1 | 4/2004 | Infante et al. |
| 2004/0081145 A1 * | 4/2004 | Harrekilde-Petersen et al. .................. 370/362 |
| 2004/0107300 A1 | 6/2004 | Padmanabhan et al. |
| 2004/0123013 A1 | 6/2004 | Clayton et al. |
| 2004/0139237 A1 | 7/2004 | Rangan et al. |
| 2004/0151188 A1 | 8/2004 | Maveli et al. |
| 2004/0160970 A1 * | 8/2004 | Dally et al. .................. 370/412 |
| 2004/0172494 A1 | 9/2004 | Pettey et al. |
| 2004/0179529 A1 | 9/2004 | Pettey et al. |
| 2004/0218579 A1 | 11/2004 | An |
| 2004/0225719 A1 | 11/2004 | Kisley et al. |
| 2004/0225764 A1 | 11/2004 | Pooni et al. |
| 2004/0233933 A1 | 11/2004 | Munguia |
| 2004/0236877 A1 | 11/2004 | Burton |
| 2005/0010688 A1 | 1/2005 | Murakami et al. |
| 2005/0033878 A1 | 2/2005 | Pangal et al. |
| 2005/0039063 A1 | 2/2005 | Hsu et al. |
| 2005/0044301 A1 | 2/2005 | Vasilevsky et al. |
| 2005/0050191 A1 | 3/2005 | Hubis |
| 2005/0080923 A1 * | 4/2005 | Elzur .................. 709/238 |
| 2005/0080982 A1 | 4/2005 | Vasilevsky et al. |
| 2005/0091441 A1 * | 4/2005 | Qi et al. .................. 711/5 |
| 2005/0111483 A1 * | 5/2005 | Cripe et al. .................. 370/463 |
| 2005/0114569 A1 | 5/2005 | Bogin et al. |
| 2005/0114595 A1 | 5/2005 | Karr et al. |
| 2005/0120160 A1 | 6/2005 | Plouffe et al. |
| 2005/0141425 A1 | 6/2005 | Foulds |
| 2005/0160251 A1 | 7/2005 | Zur et al. |
| 2005/0182853 A1 * | 8/2005 | Lewites et al. ................ 709/238 |
| 2005/0188239 A1 | 8/2005 | Golasky et al. |
| 2005/0198410 A1 | 9/2005 | Kagan et al. |
| 2005/0198523 A1 | 9/2005 | Shanbhag et al. |
| 2005/0232285 A1 | 10/2005 | Terrell et al. |
| 2005/0238035 A1 | 10/2005 | Riley |
| 2005/0240621 A1 | 10/2005 | Robertson et al. |
| 2005/0240932 A1 | 10/2005 | Billau et al. |
| 2005/0262269 A1 | 11/2005 | Pike |
| 2006/0007937 A1 * | 1/2006 | Sharma .................. 370/395.21 |
| 2006/0010287 A1 | 1/2006 | Kim |
| 2006/0013240 A1 | 1/2006 | Ma et al. |

(56) References Cited

U.S. PATENT DOCUMENTS

| | | | |
|---|---|---|---|
| 2006/0045098 A1 | 3/2006 | Krause | |
| 2006/0050693 A1 | 3/2006 | Bury et al. | |
| 2006/0059400 A1 | 3/2006 | Clark et al. | |
| 2006/0092928 A1 | 5/2006 | Pike et al. | |
| 2006/0129699 A1 | 6/2006 | Kagan et al. | |
| 2006/0136570 A1 | 6/2006 | Pandya | |
| 2006/0168286 A1 | 7/2006 | Makhervaks et al. | |
| 2006/0168306 A1 | 7/2006 | Makhervaks et al. | |
| 2006/0179178 A1 | 8/2006 | King | |
| 2006/0182034 A1 | 8/2006 | Klinker et al. | |
| 2006/0184711 A1 | 8/2006 | Pettey et al. | |
| 2006/0193327 A1 | 8/2006 | Arndt et al. | |
| 2006/0212608 A1 | 9/2006 | Arndt et al. | |
| 2006/0224843 A1 | 10/2006 | Rao et al. | |
| 2006/0233168 A1* | 10/2006 | Lewites et al. | 370/389 |
| 2006/0242332 A1 | 10/2006 | Johnsen et al. | |
| 2006/0253619 A1 | 11/2006 | Torudbakken et al. | |
| 2006/0282591 A1 | 12/2006 | Krithivas | |
| 2006/0292292 A1 | 12/2006 | Brightman et al. | |
| 2007/0050520 A1 | 3/2007 | Riley | |
| 2007/0067435 A1 | 3/2007 | Landis et al. | |
| 2007/0101173 A1 | 5/2007 | Fung | |
| 2007/0130295 A1 | 6/2007 | Rastogi et al. | |
| 2007/0220170 A1* | 9/2007 | Abjanic et al. | 709/246 |
| 2007/0286233 A1 | 12/2007 | Latif et al. | |
| 2008/0025217 A1 | 1/2008 | Gusat et al. | |
| 2008/0082696 A1 | 4/2008 | Bestler | |
| 2008/0159260 A1 | 7/2008 | Vobbilisetty et al. | |
| 2008/0192648 A1 | 8/2008 | Galles | |
| 2008/0225877 A1 | 9/2008 | Yoshida | |
| 2008/0270726 A1 | 10/2008 | Elnozahy et al. | |
| 2008/0301692 A1* | 12/2008 | Billau et al. | 718/104 |
| 2008/0307150 A1* | 12/2008 | Stewart et al. | 710/317 |
| 2009/0307388 A1 | 12/2009 | Tchapda | |
| 2010/0088432 A1 | 4/2010 | Itoh | |
| 2010/0138602 A1 | 6/2010 | Kim | |
| 2010/0195549 A1 | 8/2010 | Aragon et al. | |
| 2010/0293552 A1 | 11/2010 | Allen et al. | |
| 2011/0153715 A1 | 6/2011 | Oshins et al. | |
| 2011/0154318 A1 | 6/2011 | Oshins et al. | |
| 2012/0079143 A1 | 3/2012 | Krishnamurthi et al. | |
| 2012/0144006 A1 | 6/2012 | Wakamatsu et al. | |
| 2012/0158647 A1 | 6/2012 | Yadappanavar et al. | |
| 2012/0163376 A1 | 6/2012 | Shukla et al. | |
| 2012/0163391 A1 | 6/2012 | Shukla et al. | |
| 2012/0166575 A1 | 6/2012 | Ogawa et al. | |
| 2012/0167080 A1 | 6/2012 | Vilayannur et al. | |
| 2012/0209905 A1 | 8/2012 | Haugh et al. | |
| 2012/0239789 A1 | 9/2012 | Ando et al. | |
| 2012/0304168 A1 | 11/2012 | Raj Seeniraj et al. | |
| 2013/0031200 A1 | 1/2013 | Gulati et al. | |
| 2013/0080610 A1 | 3/2013 | Ando | |
| 2013/0138758 A1 | 5/2013 | Cohen et al. | |
| 2013/0138836 A1 | 5/2013 | Cohen et al. | |
| 2013/0179532 A1 | 7/2013 | Tameshige et al. | |

OTHER PUBLICATIONS

Ajay V. Bhatt, "Creating a Third Generation I/O Interconnect," Intel ® Developer Network for PCI Express* Architecture, www.express-lane.org, printed on Aug. 22, 2005, pp. 1-11.
Wikipedia's article on 'Infiniband' from Aug. 2010.
U.S. Appl. No. 11/083,258, Final Office Action mailed on Feb. 2, 2009, 13 pages.
U.S. Appl. No. 11/083,258, Final Office Action mailed on Jun. 10, 2010, 15 pages.
U.S. Appl. No. 11/083,258, Final Office Action mailed on Oct. 26, 2012, 30 pages.
U.S. Appl. No. 11/083,258, Non-Final Office Action mailed on Jul. 11, 2008, 12 pages.
U.S. Appl. No. 11/083,258, Non-Final Office Action mailed on Nov. 12, 2009, 13 pages.
U.S. Appl. No. 11/083,258, Non-Final Office Action mailed on Mar. 28, 2011, 14 pages.
U.S. Appl. No. 11/083,258, Non-Final Office Action mailed on Apr. 25, 2012, 30 pages.
U.S. Appl. No. 11/086,117, Final Office Action mailed on Dec. 23, 2008, 11 pages.
U.S. Appl. No. 11/086,117, Final Office Action mailed on Dec. 10, 2009, 18 pages.
U.S. Appl. No. 11/086,117, Non-Final Office Action mailed on May 6, 2009, 12 pages.
U.S. Appl. No. 11/086,117, Non-Final Office Action mailed on Jul. 22, 2008, 13 pages.
U.S. Appl. No. 11/086,117, Non-Final Office Action mailed on Jul. 22, 2010, 24 pages.
U.S. Appl. No. 11/086,117, Notice of Allowance mailed on Dec. 27, 2010, 15 pages.
U.S. Appl. No. 11/179,085, Final Office Action mailed on Oct. 30, 2007, 13 pages.
U.S. Appl. No. 11/179,085, Non-Final Office Action mailed on May 31, 2007, 14 pages.
U.S. Appl. No. 11/179,085, Notice of Allowance mailed on Aug. 11, 2008, 4 pages.
U.S. Appl. No. 11/179,085, Pre Appeal Brief Request mailed on Jan. 24, 2008, 6 pages.
U.S. Appl. No. 11/179,085, Preliminary Amendment mailed on May 27, 2008, 9 pages.
U.S. Appl. No. 11/179,085, Response to Non-final Office Action filed on Aug. 10, 2007, 8 pages.
U.S. Appl. No. 11/179,085, filed Jul. 11, 2005.
U.S. Appl. No. 11/179,437, Final Office Action mailed on Jan. 8, 2009, 13 pages.
U.S. Appl. No. 11/179,437, Non-Final Office Action mailed on May 8, 2008, 11 pages.
U.S. Appl. No. 11/179,437, Notice of Allowance mailed on Jun. 1, 2009, 8 pages.
U.S. Appl. No. 11/179,437, U.S. Patent Application mailed on Jul. 11, 2005.
U.S. Appl. No. 11/184,306, Non-Final Office Action mailed on Apr. 10, 2009, 5 pages.
U.S. Appl. No. 11/184,306, Notice of Allowance mailed on Aug. 10, 2009, 4 pages.
U.S. Appl. No. 11/200,761, Final Office Action mailed on Jul. 9, 2010, 22 pages.
U.S. Appl. No. 11/200,761, Final Office Action mailed on Aug. 13, 2009, 22 pages.
U.S. Appl. No. 11/200,761, Non-Final Office Action mailed on Jun. 11, 2013, 21 pages.
U.S. Appl. No. 11/200,761, Non-Final Office Action mailed on Aug. 31, 2012, 21 pages.
U.S. Appl. No. 11/200,761, Non-Final Office Action mailed on Jan. 20, 2010, 22 pages.
U.S. Appl. No. 11/200,761, Non-Final Office Action mailed on Mar. 12, 2009, 22 pages.
U.S. Appl. No. 11/200,761, Office Action mailed on Feb. 7, 2013, 22 pages.
U.S. Appl. No. 11/200,761, filed Aug. 9, 2005, 32 pages.
U.S. Appl. No. 11/222,590, Non-Final Office Action mailed on Mar. 21, 2007, 6 pages.
U.S. Appl. No. 11/222,590, Notice of Allowance mailed on Sep. 18, 2007, 5 pages.
U.S. Appl. No. 12/250,842, Allowed Claims mailed on Jun. 10, 2011.
U.S. Appl. No. 12/250,842, Non-Final Office Action mailed on Aug. 10, 2010, 9 pages.
U.S. Appl. No. 12/250,842, Notice of Allowance mailed on Feb. 18, 2011, 5 pages.
U.S. Appl. No. 12/250,842, Notice of Allowance mailed on Jun. 10, 2011, 5 pages.
U.S. Appl. No. 12/250,842, Response to Non-Final Office Action filed on Nov. 19, 2010, 8 pages.
U.S. Appl. No. 12/250,842, filed Oct. 14, 2008.
U.S. Appl. No. 12/544,744, Final Office Action mailed on Feb. 27, 2013 27 pages.
U.S. Appl. No. 12/544,744, Non-Final Office Action mailed on Jun. 6, 2012, 26 pages.

(56) References Cited

OTHER PUBLICATIONS

U.S. Appl. No. 12/862,977, Non-Final Office Action mailed on Mar. 1, 2012, 8 pages.
U.S. Appl. No. 12/862,977, Non-Final Office Action mailed on Aug. 29, 2012, 9 pages.
U.S. Appl. No. 12/862,977, Notice of Allowance mailed on Feb. 7, 2013, 11 pages.
U.S. Appl. No. 12/890,498, Non-Final Office Action mailed on Nov. 3, 2011, 10 pages.
U.S. Appl. No. 12/890,498, Non-Final Office Action mailed on May 21, 2013, 22 pages.
U.S. Appl. No. 13/229,587, Non-Final Office Action mailed on Oct. 6, 2011, 4 pages.
U.S. Appl. No. 13/229,587, Notice of Allowance mailed on Jan. 19, 2012, 5 pages.
U.S. Appl. No. 13/229,587, Response to Non-Final Office Action filed on Jan. 4, 2012, 4 pages.
U.S. Appl. No. 13/445,570, Notice of Allowance mailed on Jun. 20, 2012, 5 pages.
Kesavan et al., "Active CoordinaTion (ACT)—Toward Effectively Managing Virtualized Multicore Clouds", IEEE, 2008.
Liu et al., "High Performance RDMA-Based MPI Implementation over InfiniBand", ICS'03, San Francisco, ACM, Jun. 23-26, 2003, 10 pages.
Poulton, "Xsigo—Try it out, I dare you!", Nov. 16, 2009.
Ranadive et al., "IBMon: Monitoring VMM-Bypass Capable InfiniBand Devices using Memory Introspection", ACM, 2009.
Wong et al., "Effective Generation of Test Sequences for Structural Testing of Concurrent Programs", IEEE International Conference of Complex Computer Systems (ICECCS'05), 2005,.
Xu et al., "Performance Virtualization for Large-Scale Storage Systems", IEEE, 2003, 10 pages.
U.S. Appl. No. 11/083,258, Advisory Action mailed on Jan. 24, 2013, 3 pages.
U.S. Appl. No. 11/200,761, Final Office Action mailed on Jan. 9, 2014, 23 pages.
U.S. Appl. No. 11/083,258, Non-Final Office Action, mailed Sep. 18, 2013, 35 pages.

* cited by examiner

HIGH AVAILABILITY AND I/O AGGREGATION FOR SERVER ENVIRONMENTS

CROSS-REFERENCE TO RELATED APPLICATIONS

This application claims priority from U.S. Provisional Patent Application No. 60/590,450 titled METHODS AND APPARATUS FOR RESOURCE VIRTUALIZATION, filed on Jul. 22, 2004 by Shreyas Shah, Subramanian Vinod, R. K. Anand, and Ashok Krishnamurthi, the entirety of which is incorporated by reference in its entirety for all purposes.

BACKGROUND OF THE INVENTION

1. Field of the Invention

The present invention relates to resource virtualization. In one example, the present invention relates to methods and apparatus for efficiently implementing virtualization, allocation, redundancy, and management of resources used to connect servers to packet based networks such as Internet Protocol (IP) networks.

2. Description of Related Art

Conventional servers connect to packet networks such as IP networks using port adapters such as network interface cards (NICs). Each NIC is connected to an IP network port. If many servers are connected to an IP network, a large number of NICs and IP network ports are required. A large number of NICs and IP network ports are required even though many NICs and ports remain underutilized, particularly when high availability is configured.

In many implementations, multiple NICs are included in each server to provide for redundancy and load sharing. In some instances, one NIC is configured as the active NIC while another NIC is configured as a redundant NIC. When an active NIC fails, the server devotes processing resources in order to effectively switchover to using the redundant NIC. However, having multiple NICs in each server can lead to even less efficient resource utilization and drain processing resources during failover.

Techniques and mechanisms for sharing resources such as NICs and providing high availability connections to IP networks are limited. In many instances, conventional mechanisms still lead to underutilization and resource inflexibility. Network administration issues also remain complicated with a need for a large number of NICs and network ports. Consequently, it is desirable to provide methods and apparatus for efficiently providing high availability and I/O aggregation to servers connected to packet based networks.

SUMMARY OF THE INVENTION

Methods and apparatus are provided for virtualizing port adapter resources such as network interface cards (NICs) used to connect servers to packet based networks. Resources are offloaded from individual servers onto a resource virtualization switch. Servers connected to the resource virtualization switch using an I/O bus connection share access to NICs. Redundancy can be provided using multipathing mechanisms implemented at individual servers or high availability mechanisms implemented at the resource virtualization switch. Switchover can occur between ports on the same port adapter, between ports on separate adapters, or between ports on separate resource virtualization switches.

In one embodiment, a resource virtualization switch coupled to a network is provided. The resource virtualization switch includes multiple network interfaces, multiple I/O bus ports, and a resource virtualization switch platform. The multiple I/O bus ports are connected to multiple servers. The resource virtualization switch platform is associated with the multiple network interfaces. The resource virtualization switch platform is operable to map communications from the first server and the second server onto the first network interface.

In another embodiment, a method for providing resources to multiple servers is provided. An I/O bus connection is provided between a resource virtualization switch and at least a first server and a second server. The first server and the second server are associated with separate address spaces. Communications are received from the first server and the second server at the resource virtualization switch. Communications from the first server and the second server are mapped onto a first port adapter associated with the resource virtualization switch. Communications from the first server and the second server are transmitted onto a network using the first port adapter.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Figure 1:
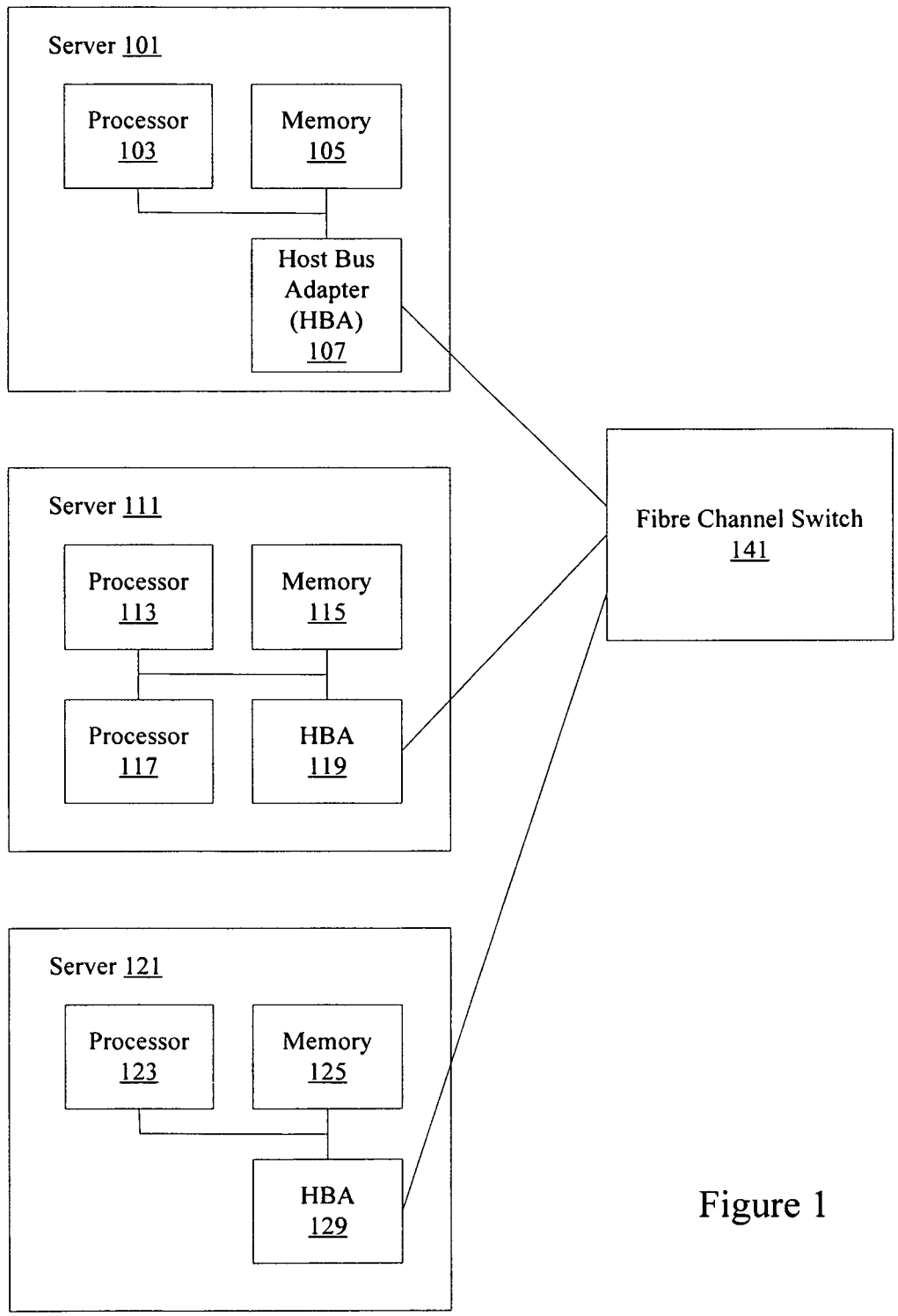
FIG. 1 is a diagrammatic representation showing a typical server configuration.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of Peripheral Control Interface (PCI) Express and Internet Protocol (IP) networks. However, it should be noted that the techniques of the present invention can be applied to a variety of different standards and variations to PCI Express and IP networks. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted.

A server or computing system generally includes one or more processors, memory, as well as other peripheral components and peripheral interfaces such as network interface cards (NICs), host bus adapters (HBAs), hardware accelerators, graphics accelerators, disks, etc. To increase processing power, servers are often aggregated as blades in a rack or as servers in a server farm or data center and interconnected using various network backbones or backplanes. In some examples, each server includes a NIC configured to allow communication over an IP network. The IP network also typically includes network routers allowing routing of traffic between various network nodes. To provide fault-tolerance, individual servers are often configured with redundant resources.

For example, a server may include redundant port adapters to allow for continued operation in the event of port adapter failure. Each server may also have multiple processors or multiple hardware accelerators to provide for fault tolerance. However, providing redundant resources in each server in a server rack or server farm can be expensive. A server farm including 40 individual systems and 40 adapters would require typically an additional 40 adapters for redundancy on each particular system. Redundancy can typically only be provided in a rigid and inflexible manner. Providing high availability for resources in server environments can be highly inefficient and costly.

Because resources such as peripheral components and peripheral interfaces are assigned on a per server or a per processor basis, other servers do not typically have access to these resources. In order to provide adequate resources for each server, resources are typically over-provisioned. That is, more bandwidth is provided than is typically needed. For example, some currently available NICs are arranged to provide 1 Gb/s of bandwidth. However, typical servers rarely use that amount. More network interface bandwidth is allocated than is typically used simply to handle worst-case or expected worst-case scenarios.

Resources are over-provisioned resulting in overall waste and low utilization. Resource assignment on a per server or a per processor basis also limits the ability to reconstruct or reconfigure a resource environment. For example, a system administrator may want to dynamically allocate unused NIC resources to other servers needing bandwidth. Conventional configurations do not allow efficient reassignment. Conventional NICs are also not hot pluggable, resulting in longer downtimes during server administrative operations such as upgrades.

Having a number of disparate servers also increases the complexity associated with individual system management. Servers typically have to be individually administered without the benefit of centralized administration. Oftentimes, servers would be equipped with graphics cards and I/O subsystems to allow for system administrator access.

Conventional architectures create resource usage inefficiency, server management inefficiency, fault tolerance limitations, and reconfiguration inflexibility, along with a number of other drawbacks. Consequently, the techniques of the present invention provide for resource virtualization, more efficient utilization of resources, and high availability. According to various embodiments, each server no longer has access to a physical peripheral component or a physical peripheral interface such as a NIC, but instead has access to logical or virtual resources.

In some embodiments, resources such as NICs are removed from individual servers and aggregated at a resource virtualization server or resource virtualization switch. In one example, the resource virtualization switch creates an on-demand provisioned and traffic engineered data center by seamlessly integrating with existing hardware and software infrastructure. The resource virtualization switch receives requests from individual servers over a bus interface such as PCI Express and determines what resources to provide to handle individual requests. Any device allowing sharing of multiple resources such as interfaces and components between multiple servers connected over an I/O bus interface is referred to herein as a resource virtualization switch or resource virtualization server. For example, a first server may request to transmit data over a local area network. The request is routed to the resource virtualization switch that then determines how to handle the request. In one example, the request is forwarded to the NIC corresponding to the first server.

Access to resources such as I/O and hardware acceleration resources remains at the bus level. Any mechanism allowing interconnection of components in a computer system is referred to herein as a bus. Examples of buses include PCI, PCI Express, Vesa Local Bus (VLB), PCMCIA, and AGP. For example, master components (e.g. processors) initiate transactions such as read and write transactions over buses with slave components (e.g. memory) that respond to the read and write requests. Buses are typically associated with a memory space to allow for use of the read and write transactions. Any device having one or more processors that are able to access a shared memory address space is referred to herein as a server, computer, or computing system.

In one example, a server includes multiple processors that can all access a shared virtual or physical memory space. Although each processor may own separate cache lines, each processor has access to memory lines in the memory address space. A server or computing system generally includes one or more processors, memory, as well as other peripheral components and peripheral interfaces such as network interface cards (NICs), hardware accelerators, host bus adapters (HBAs), graphics accelerators, disks, etc. A processor can communicate with a variety of entities including an IP network.

According to various embodiments, NICs are included in a resource virtualization switch connected to multiple servers using a bus interface such as PCI Express. The bus interface provides a low latency, high bandwidth connection between the multiple servers and the NIC in the resource virtualization switch. The resource virtualization switch aggregates several server memories into a unified memory or an aggregated memory address view to allow sharing of a physical fibre channel NIC among several servers. In one example, a resource virtualization switch can aggregate multiple servers into the same I/O port. If a NIC has a capacity of 1 Gbps and one server uses only 250 Mbps, the remaining 750 Mbps can be distributed to the other servers so that the entire bandwidth capacity is used. Resources can be more effectively allocated in this manner.

High availability can be provided in a variety of manners. High availability is provided to allow switchovers to a different port on a port adapter, to a different port on a separate port adapter on the same resource virtualization switch, and to a different port on a separate resource virtualization switch. Consequently, failover support is provided in the event of link failure, I/O port failure, PCI-Express link failure, or resource virtualization switch failure. According to various embodiments, failover remains application independent and no restarting or rebinding is required at the application level.

An administrator can provision and partition resources at the resource virtualization switch based on particular needs and requirements. Quality of service (QOS) and traffic engineering schemes can be implemented at the bus level. In a conventional architecture, quality of service (QoS) and traffic engineering are available only at the network level and not at the bus level. Traffic associated with particular devices or servers can be given priority or guaranteed bandwidth. The total amount of resources can be decreased while increasing resource utilization. The resource virtualization mechanism can be introduced into existing server racks and farms with little disruption to system operation.

In some examples, mapping of traffic-engineered flows is performed based on PCIe traffic class and virtual channels. The resource virtualization mechanism can classify flows and provision bandwidth. Other features such as scatter gather, zero copy on receive, TCP/IP and UDP check sum offload can also be performed by a resource virtualization mechanism.

FIG. 1 is a diagrammatic representation showing a conventional implementation for connecting servers to an IP network. Server 101 includes a processor 103, memory 105, and NIC 107. The processor 103 communicates with other components and interfaces in the system using an I/O bus and associated I/O controllers. One or more bus bridges may also be used. In typical implementations, communications between components and interfaces in server 101 occur over an I/O bus such as PCI. Server 111 includes processors 113 and 117, memory 115, and NIC 119. Communication within server 111 similarly occurs over one or more I/O buses. Server 121 includes a processor 123, memory 125, and NIC 129. In order to allow communication with an IP network through network router 141, NICs 107, 119, and 129 are provided. In one example, a processor 103 is configured to drive NIC 107 to initiate a connection to a network router 141. Similarly, processors 113 and 117, and processor 123 are configured to drive NICs 119 and 129. During the login processes, parameters and other information may be exchanged with the IP network and other IP network connected ports.

The various NICs 107, 119, and 129 are also associated with IP addresses and media access control (MAC) addresses. Each server and associated NIC encapsulates data into IP packets for transmission to a network router 141. Encapsulation may involve adding appropriate Telnet Control Protocol (TCP) and IP headers and addresses. Each NIC is also configured to remove TCP/IP headers and addresses and provide data to an associated processor over a system bus when IP packets are received from an IP network.

To provide for reliability, servers 101, 111, and 121 may include multiple NICs to allow effective switchover in the event one NIC fails. Furthermore, many servers may have redundant lines physically connecting the various NICs to the network router 141. The resource allocation and system management inefficiencies are magnified by the physical complexities of routing redundant lines. Although only NICs are noted, each server 101, 111, and 121 may also include host bus adapters (HBAs) and hardware accelerators.

Figure 2:
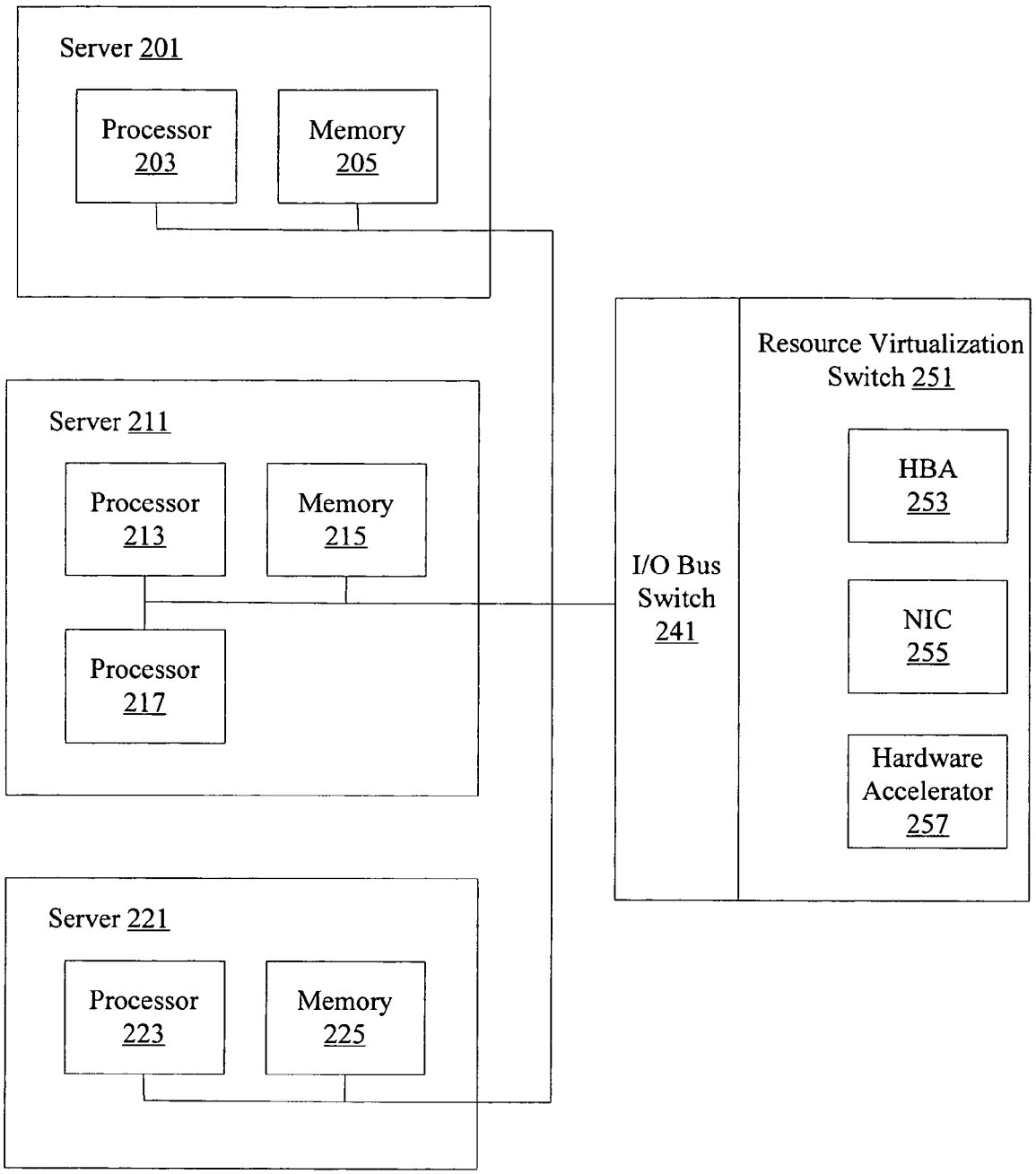
FIG. 2 is a diagrammatic representation showing multiple servers having virtualized resources.

FIG. 2 is a diagrammatic representation showing separate servers connected to a resource virtualization switch 251. Server 201 includes processor 203 and memory 205. Server 211 includes processor 213 and 217 and memory 215. Server 221 includes only processor 223 and memory 225. Components and peripherals in each server 201, 211, and 221 are connected using one or more I/O buses. It should be noted that a server can also be a guest operating system or a virtual machine. According to various embodiments, the I/O bus is extended to allow interconnection with other servers and external entities through an I/O bus interconnect such as an I/O bus switch 241. In one example, server 201 no longer uses addresses such as port world wide names (pwwns) associated with an HBA or media access control (MAC) addresses associated with a NIC to communicate with other servers and external networks, but each server is instead configured communicate with a resource virtualization switch 251 using an I/O bus switch 241.

An I/O bus switch 241 may be a standalone entity, integrated within a particular server, or provided with a resource virtualization switch 251. According to various embodiments, components such as HBA 253, NIC 255, and hardware accelerator 257, can be offloaded from servers 201, 211, and 221 onto a resource virtualization switch 251. The resources including NIC 243 and NIC 245 are maintained in a shared and virtualized manner on a resource virtualization switch 251. Links can be provided between the resource virtualization switch and external switches such as a network switch. According to various embodiments, the resource virtualization switch 251 includes control logic that drives a NIC 253 connected to an external network independently from server 201, 211, and 221. In some instances, NIC initialization and management processes may be implemented by a resource virtualization switch 251 control plane even before any servers 201, 211, and 221 are connected to the resource virtualization switch.

According to various embodiments, a series of servers is connected to the resource virtualization switch using a PCI Express bus architecture. In some cases, a PCI Express bridge is used to increase compatibility with some existing systems. However, a PCI Express bridge is not necessarily needed. By using a resource virtualization switch, the number of resources and links can be significantly reduced while increasing allocation efficiency.

Figure 3:
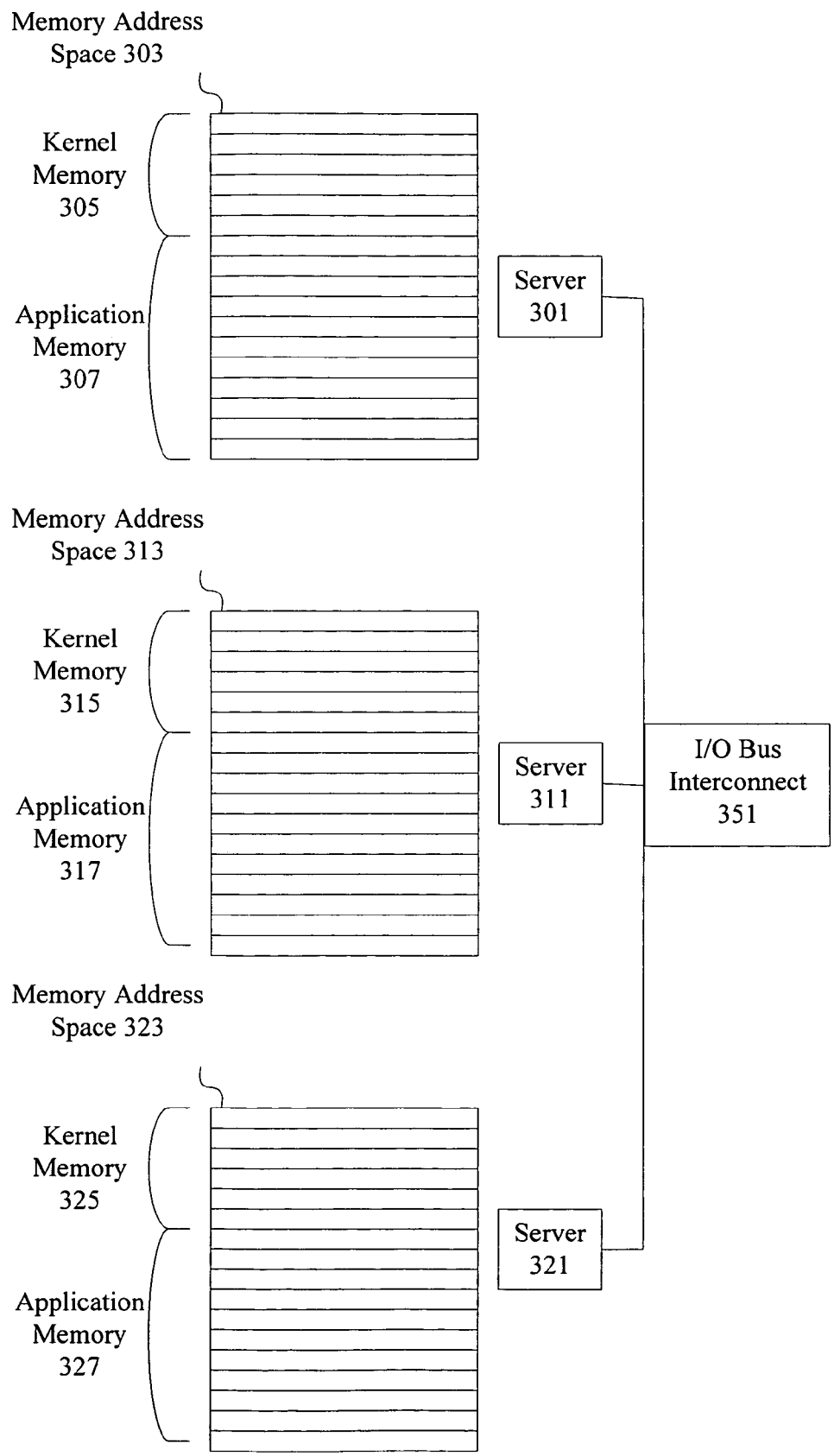
FIG. 3 is a diagrammatic representation depicting a typical layer model for transmission over a bus protocol.

FIG. 3 is a diagrammatic representation showing separate servers each associated with a memory address space. According to various embodiments, server 301 includes a memory address space 303 with kernel memory 305 and application memory 307. The memory address space 303 may be a physical memory address space or a virtual memory address space. Server 301 may include one or more processors with access to the memory address space. Server 311 includes a memory address space 313 with kernel memory 315 and application memory 317. The memory address space 313 may be a physical memory address space or a virtual memory address space. Server 311 may include one or more processors with access to the memory address space. Server 321 includes a memory address space 323 with kernel memory 325 and application memory 327. The memory address space 323 may be a physical memory address space or a virtual memory address space. Server 321 may include one or more processors with access to the memory address space.

According to various embodiments, the separate servers 301, 311, and 321 are connected to a resource virtualization switch using an I/O bus. In one embodiment, an I/O bus interconnect 351 such as an I/O bus switch is used to connect the separate servers to external entities such as an IP network. The I/O bus interconnect 351 is associated with logic that allows aggregation of the memory address spaces 303, 313, and 323. Any logical address space that includes the memory address spaces of multiple computer systems or servers is referred to herein as an aggregated memory address space. In one embodiment, an aggregated memory address space is managed by an I/O bus switch or by a resource virtualization switch.

When a transaction occurs in a memory address space 313, the resource virtualization switch can identify the transaction as a server 311 transaction. The memory address space regions can be used to classify traffic. For example, data received from a server 311 in memory address space 313 can be assigned a particular identifier for transmission onto an IP network. When a reply to the transmission is received from the IP network, the exchange identifier is used to determine which server the resource virtualization switch forwards the reply to. In one example, a table listing server identifiers, memory address spaces, and source and destination address pairs is maintained by a resource virtualization switch. When a server writes a data block to a resource virtualization switch, an optional server identifier is assigned to IP packets for transmitting that data block. Reply messages with the same server identifier can then be appropriately forwarded to the originating server. It will be recognized that a variety of parameters other than server identifiers can be used to classify traffic.

It should also be noted that each server 301, 311, and 321 may be embodied in separate computer cases. In other examples, each server may be embodied in a card, a blade, or even a single integrated circuit (IC) device or portion of an IC device. Techniques for performing interconnection can be implemented on one or more application specific integrated circuits (ASICs) and/or programmable logic devices (PLDs). The entire interconnection mechanism can be provided on a server, a card, a chip, or on a processor itself.

Figure 4:
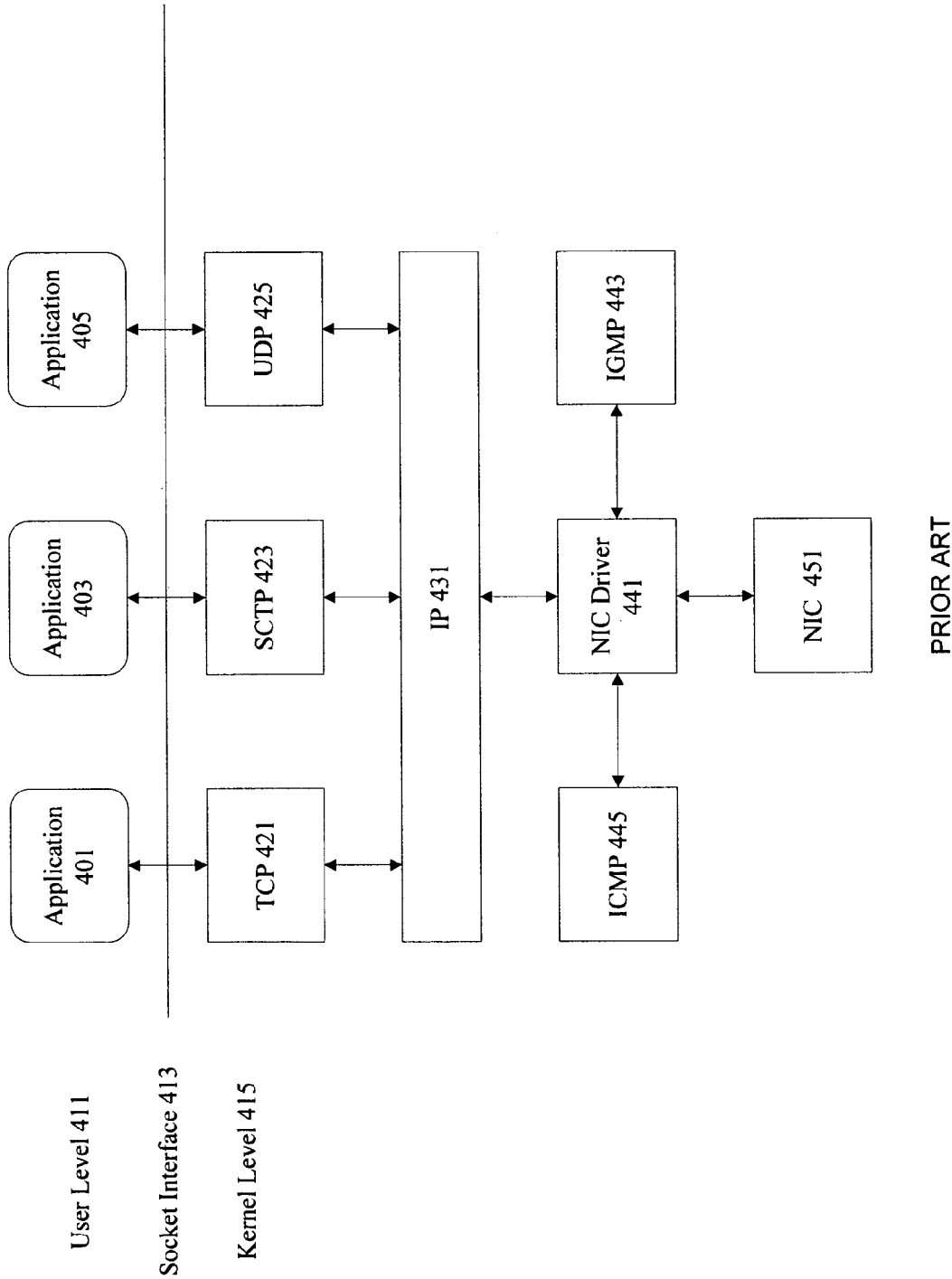
FIG. 4 is a diagrammatic representation depicting a layer model using a network interface card (NIC) device driver.

FIG. 4 is a diagrammatic representation showing one example of a conventional software architecture for network communications. A user level 411 includes multiple applications 401, 403 and 405. The user level 411 is coupled to a kernel level 415 through a socket interface 413. Residing at the kernel level are various transport layer protocols such as a transport control protocol (TCP) 421, user datagram protocol (UDP) 425, and Stream Control Transmission Protocol (SCTP) 423.

In some examples, the transport layer protocols use the network layer Internet Protocol (IP) 431 associated with a device driver. The device driver may be a network interface card (NIC) driver 441 associated with the Internet Control Message Protocol (ICMP) 445 and the Internet Group Management Protocol (IGMP) 443. The device driver 441 is configured to allow kernel access to a peripheral such as a network interface card (NIC). In typical implementations, the NIC is included as a component on the server. However, including a resource such as a NIC on a server can be inefficient.

Figure 5:
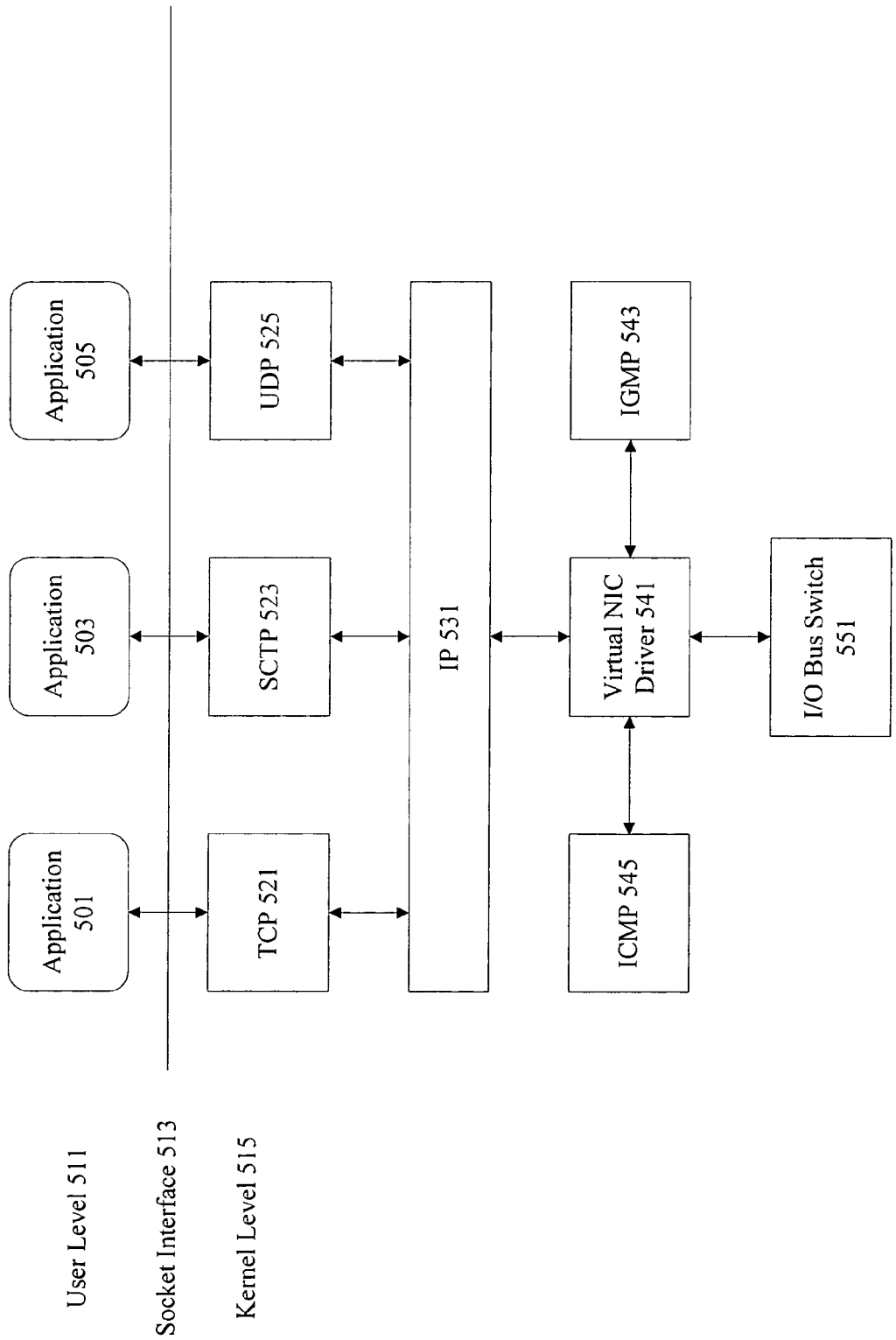
FIG. 5 is a diagrammatic representation depicting a layer model using a virtual NIC (VNIC) device driver.

FIG. 5 is a diagrammatic representation showing one example of a software architecture using the interconnection mechanisms of the present invention where a virtualized NIC is used for communication with external entities. A user level 511 includes multiple applications 501, 503, and 505. The user level 511 is coupled to a kernel level 515 through a socket interface 513. Residing at the kernel level 515 are various transport layer protocols such as a transport control protocol (TCP) 521, user datagram protocol (UDP) 525, and Stream Control Transmission Protocol (SCTP) 523. In some examples, the transport layer protocols use the network layer Internet Protocol (IP) 531 associated with a device driver. However, the device driver is no longer a conventional device driver associated with a NIC or any other resource.

In some examples, the device driver is replaced with a modified device driver 541 or a virtual device driver 541 that may be associated with the Internet Control Message Protocol (ICMP) 545 and the Internet Group Management Protocol (IGMP) 543. Any device driver configured to drive a resource virtualization switch is referred to herein as a modified or virtual device driver. The modified or virtual device driver 541 is configured to allow kernel access to a virtual peripheral. The kernel continues to operate as though it has access to a peripheral such as a NIC card included in the server. That is, the kernel may continue to operate as though the NIC can be accessed directly over the bus without using a resource virtualization switch.

However, the virtual device driver supplied is actually driving access to an I/O bus switch 551 and an associated resource virtualization switch. The I/O bus switch 551 and associated resource virtualization switch can then perform processing to determine how to handle the request to access a particular resource such as a NIC. In some examples, the resource virtualization switch can apply traffic shaping or prioritization schemes to various requests.

Applications may continue to use a conventional network technology such as TCP/IP and a virtual NIC driver 551 can automatically modify data to allow transmission on an I/O bus such as PCI Express. Hardware accelerators such as eXtensible Markup Language (XML) accelerators, security accelerators, digital signal processors (DSPs), and graphics accelerators can be virtualized while allowing rapid and efficient access in a secure local bus environment. Mainframe access using KVM can be shared. Quality of service and traffic engineering can be applied at the bus level. Furthermore, resources can be flexibly provisioned and reconfigured. Multiple VNICs can be assigned to a single application to allow for path redundancy in the event that a single NIC fails.

Figure 6:
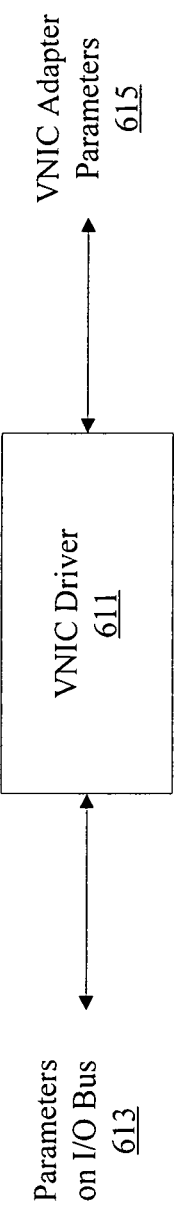
FIG. 6 is a diagrammatic representation showing one example of a VNIC driver.

FIG. 6 is a diagrammatic representation showing one example of a virtual NIC (VNIC) driver. Any mechanism allowing the mapping of multiple servers over an I/O bus to a single NIC device is referred to herein as a VNIC driver. When a conventional NIC card or device is connected to a computer system over a bus, a number of I/O bus parameters 613 are configured for that NIC. According to various embodiments, a VNIC driver 611 keeps the same set of I/O bus parameters 613 to allow a VNIC driver to operate in conventional systems. In one example, a processor in a server uses the same set of parameters and formats used for a NIC driver to operate a VNIC driver. According to various embodiments, both a NIC and a VNIC driver 611 use the same NIC parameters 613. Some configuration parameters that may be used include the following:

- data bus width;
- physical address;
- types of interrupts that may be serviced;
- size of the receive buffer ring;
- buffer threshold;
- types of data that can be received In some embodiments, a NIC driver typically includes a send driver and a receive driver. A send driver initiates a transmission whenever the upper level software passes data to the driver. If the driver is unable to transmit the packet immediately, the supplied packet is queued in a transmit-pending buffer associated with a NIC. However, in an implementation using VNICs, the supplied packet is transmitted immediately over an I/O bus to a resource virtualization switch. In some instances, the resource virtualization switch queues the packet in a transmit-pending buffer or in a queue associated with the initiating server. After forwarding the packet, the send driver operates in conjunction with an interrupt service routing (ISR) and interrupts the processor to signal the end of transmission and indicate status to the processor.

A receive driver conventionally transfers data received from a network to the memory of the host. Typically, network data is received on a receive buffer ring associated with a NIC card and transferred to memory upon accessing an ISR. However, since a NIC is moved from a server onto a resource virtualization switch, the VNIC driver receives data directly from an I/O bus. The VNIC driver is interrupt driven and arbitrates for access to the I/O bus connecting the host to the resource virtualization switch. When access is available, the resource virtualization switch reads buffer rings or descriptor queues associated with a resource virtualization switch and transfers data into its own receive buffer ring. It can then proceed to interrupt the host processor to transfer data into host memory or directly transfer data into host memory and interrupt the host processor with status information when the transfer is complete.

Figure 7:
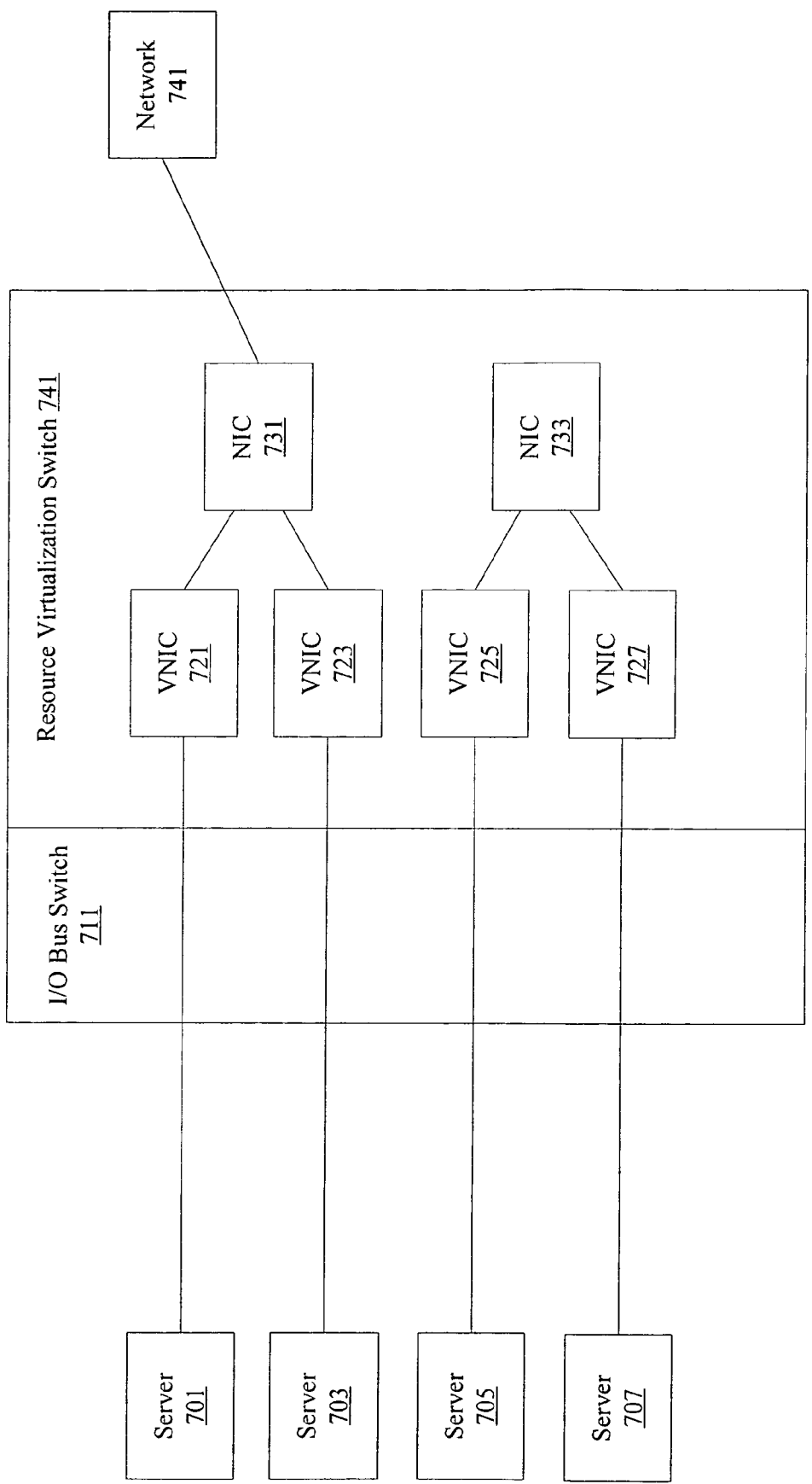
FIG. 7 is a diagrammatic representation showing one example of a VNIC coupled to one or more NICs.

FIG. 7 is a diagrammatic representation showing multiple servers mapped to the same resource virtualization switch resources. According to various embodiments, servers 701, 703, 705, and 707 are connected to VNICs 721, 723, 725, and 727 respectively through I/O bus switch 711. In some embodiments, each VNIC is associated with a buffer ring or descriptor ring that servers access in order to write data to the resource virtualization switch. For example, the buffer/descriptor ring may include read queues, write queues, and control queues which may not necessarily hold the data itself, but may be used to hold descriptors identifying or referencing the data in memory. Descriptors are used in a number of conventional I/O controller applications.

Consequently, when a server is writing to a corresponding VNIC, the server will write descriptors into the buffer/descriptor ring of corresponding VNIC. In one example, virtual NICs 721 and 723 are included in a VNIC chip coupled to NIC 731. VNICs 721 and 723 each have buffer/descriptor rings accessible by servers bound to those particular VNICs. Similarly, servers may be bound to VNICs 725 and 727 included in a separate VNIC chip and coupled to NIC 733. Each VNIC chip can be coupled to multiple servers, depending on the number of available VNIC chip ports. In one example, a VNIC chip has 4 ports connected to four separate servers over a PCI Express bus. Each VNIC chip can be coupled to separate conventionally available NICs or can have NIC functionality integrated within each chip.

When a data sequence is received from a server 701 at a VNIC 721, information identifying the server associated with the data sequence is mapped with server 701 and maintained in a database associated with VNIC 721. The NIC 731 then forwards the data onto an IP network with information identifying a particular exchange sequence, conversation, port number, or originating server. According to various embodiments, the server 701 and VNIC 721 communicate using conventional bus arbitration mechanisms available on a PCI Express bus. NICs 731 and 733 communicate with external network entities in the same manner conventional NICs communicate.

Figure 8:
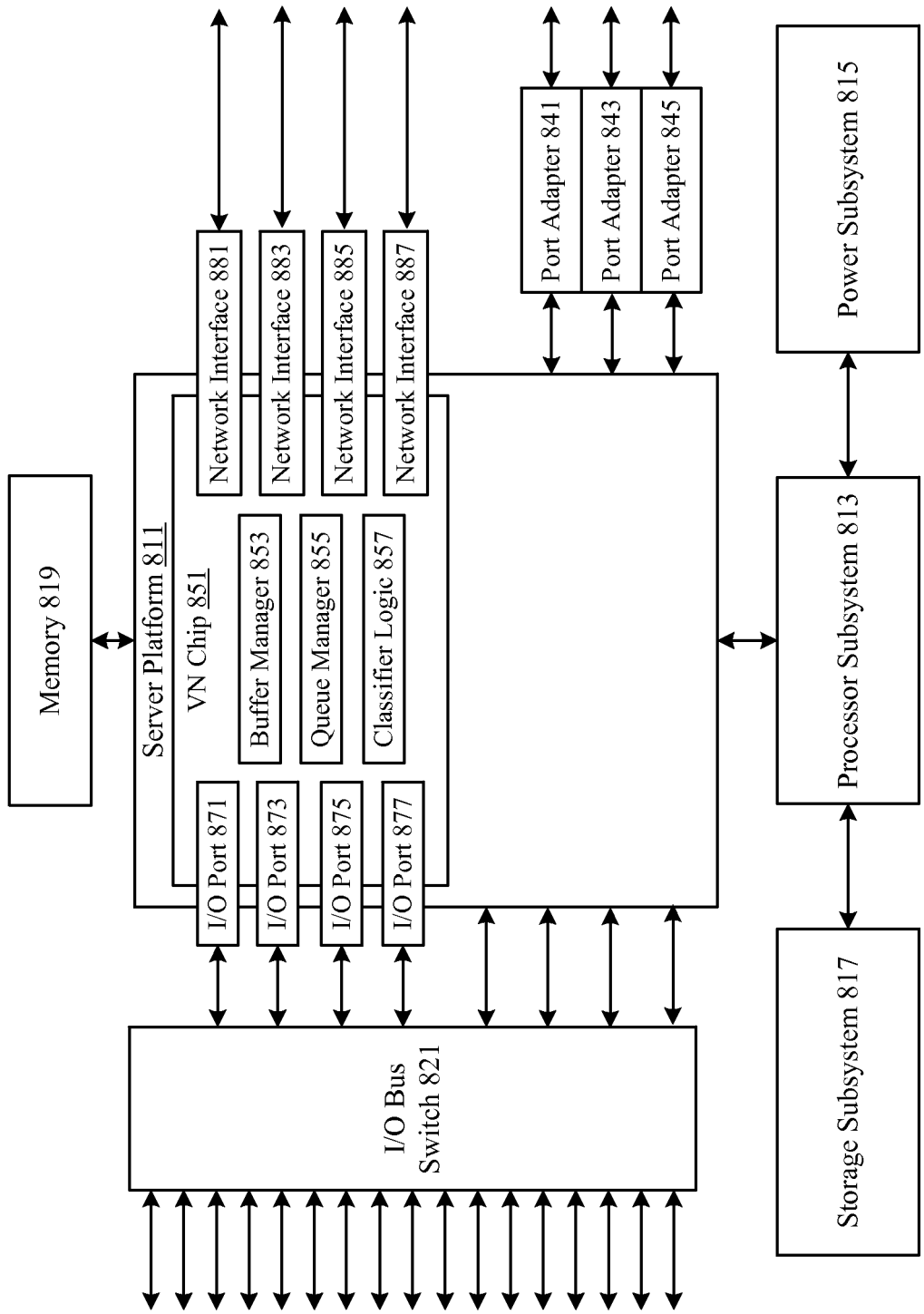
FIG. 8 is a diagrammatic representation showing a resource virtualization switch platform.

FIG. 8 is a diagrammatic representation showing one example of a resource virtualization switch. An I/O bus switch 821 is connected to multiple computer systems using an I/O bus such as a PCI Express bus. Port adapters 841-845 are associated with multiple resources such as HBAs, sATAs, hardware accelerators, etc. According to various embodiments, a VNIC chip or VN chip 851 has integrated port adapters in network interfaces 881-887. The network interfacse 881-887 may be MAC interfaces associated with multiple gigabyte ports. According to various embodiments, network interfaces 881-887 include logic mechanisms conventionally found in a NIC. The server platform 811 manages interaction between the servers connected to the I/O bus switch 821 and various resources associated with the port adapters 841-845 and network interfaces 881-887.

The server platform 811 is associated with memory 819 and a processor subsystem 813, a power subsystem 815, and a storage subsystem 817. In some embodiments, the server platform 811 includes tables with information mapping various servers connected through the I/O bus switch 821 and various port adapter resources and network interfaces. The processor subsystem 813 is configured to manage port adapter resource as though the port adapters and network interfaces 881-887 were included in individual servers. In one example, the processor subsystem 813 is configured to initialize an IP network connection regardless of whether servers have been connected to the server platform 811.

According to various embodiments, the I/O bus switch 821 supports flexible virtual channel configuration, high availability, and dynamic port configurations. Examples of I/O bus switches include the PCI Express switch PEX 8532 available from PLX Technology, Inc. of Sunnyvale, Calif. and the PCI Express switch PES-48G available from IMC Semiconductor of Agoura Hills, Calif.

In one embodiment, a VNIC chip or VN chip 851 is coupled to the I/O Bus switch 821. The VN chip 851 has I/O ports 871-877 such as PCI Express interfaces coupled to the I/O bus switch 821. The VN chip 851 also has a connection with the processor subsystem 813 and a series of network interfaces 881-887 connecting the VN chip 851 to external network entities. In other examples, the VN chip may not include NIC interfaces and instead may be connected to conventional NICs.

The VN chip 851 includes classifier logic 857, a queue manager 855, and a buffer manager 853. According to various embodiments, the classifier logic 857 includes parse and lookup logic configured to identify information such as a packet destination server and priority. Classifier logic can also be used to filter incoming data or apply traffic policing policies. In some instances, classifier logic can be used to block packets in order to implement a firewall. In one embodiment, classifier logic 857 parses a packet and uses the information in the packet to identify entries in lookup tables. The data is then buffered. Buffer manager 853 manages data in memory associated with the VN chip 851. Queue manager

855 manages descriptors for data posted. A descriptor can include a reference to a memory location, a length, a source port, and a multicast count, as well as other parameters.

In one example, classifier logic 857 determines that the packet received is a high priority packet and should be placed in a high priority queue by the buffer manager 853. Parameters provided may include a pointer, a length, a source port, a multicast count, and a queue identifier. The data is then placed into memory and information referencing the data such as a pointer and a length is posted into a buffer ring or a descriptor ring. When a connected server successfully arbitrates for bus access, the server reads the buffer ring or descriptor ring and obtains the data from memory associated with the VN chip. According to various embodiments, the server reads the data directly into its own memory.

Each individual server may also include descriptor queues. As will be appreciated, the servers connected to the I/O Bus Switch including the resource virtualization switch arbitrate for access to the I/O Bus. When access is obtained, data can be read from memory associated with one of the server based on the information provided in the descriptor queues.

More information about descriptors is provided in U.S. patent application Ser. No. 11/086,117 by Ariel Cohen, Shreyas Shah, and Raymond Lim filed on Mar. 21, 2005 and titled COMMUNICATION BETWEEN COMPUTER SYSTEMS OVER AN INPUT/OUTPUT (I/O) BUS, the entirety of which is incorporated by reference for all purposes.

Redundancy mechanisms are also provided to allow continued operation in the event that a NIC or other resource fails or a resource virtualization switch itself fails. Redundancy mechanisms can be managed by a VNIC device or VN chip, a resource virtualization switch, or by the individual servers themselves.

Figure 9:
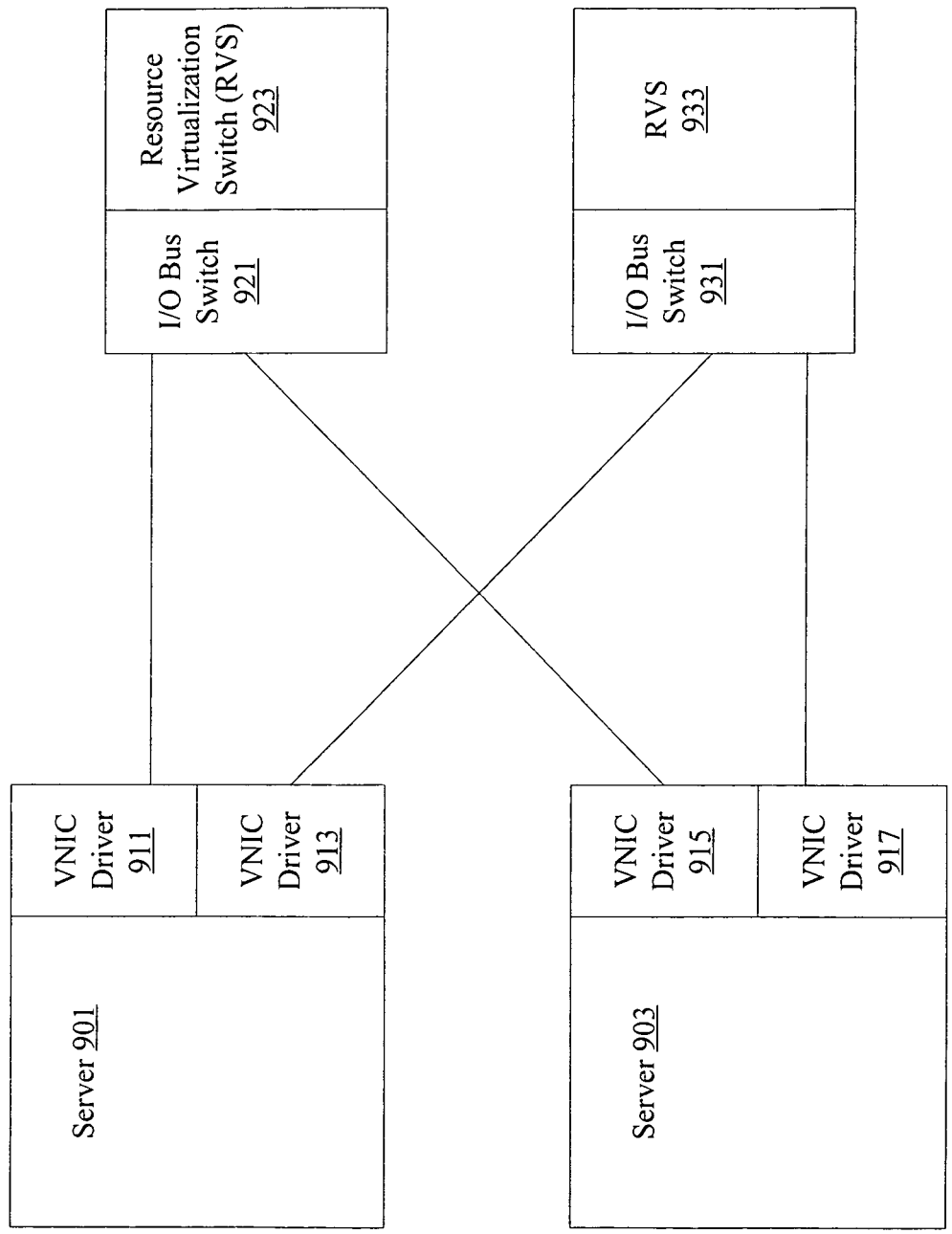
FIG. 9 is a diagrammatic representation showing multipathing and a VNIC adapter and coupled to active and passive resources.

FIG. 9 is a diagrammatic representation showing one technique for providing redundancy that involves management by individual servers. Multipathing is a conventional mechanism that allows the creation of interface groups that allow standby or simultaneous operation of devices. In one example, a server includes multiple device drivers associated with multiple NIC cards. One card may be active and the other standby, or the NIC cards may be used simultaneously to allow load balancing. However, requiring multiple NIC cards in conventional implementations can lead to device underutilization.

The techniques and mechanisms of the present invention contemplate providing multipathing using VNICs. In one embodiment, multiple VNIC device drivers 911 and 913 are configured on a server 901. Multiple VNIC device drivers 915 and 917 are configured on server 903. The server performs protocols such as link aggregation or IP multipathing to achieve redundancy. The VNIC device drivers are associated with different VNICs and NICs and possibly different resource virtualization switches. In one embodiment, a server 901 includes an active VNIC driver 911 associated with resource virtualization switch 923. If the NIC in resource virtualization switch 923 fails, or the resource virtualization switch 923 itself fails, the standby VNIC driver 913 can take over operation. The VNIC driver on the server gets an indicator that a VNIC, NIC, or NIC port is down. Switchover can occur after a period of inactivity, interrupts, or after failure to receive heartbeat indicators. The driver propagates this information to the IP routing layer where all routes that correspond to that device are deleted. If there is a redundant configuration available, such as a redundant driver, the IP routing layer replaces the original outgoing interface with the new redundant interface. The traffic is then forwarded using the standby VNIC driver.

By providing multiple VNIC device drivers with each server, port failure, failure, and resource virtualization switch failure can all be handled without excessive detriment to higher layer applications. However, each VNIC driver may be associated with NICs that have different IP addresses and MAC addresses. However, protocols such as link aggregation and IP multipathing require processing resources from the server. Processing resources may or may not be readily available. Furthermore, because the redundant NIC used has a different IP and MAC address, route updates may take a longer period of time.

Figure 10:
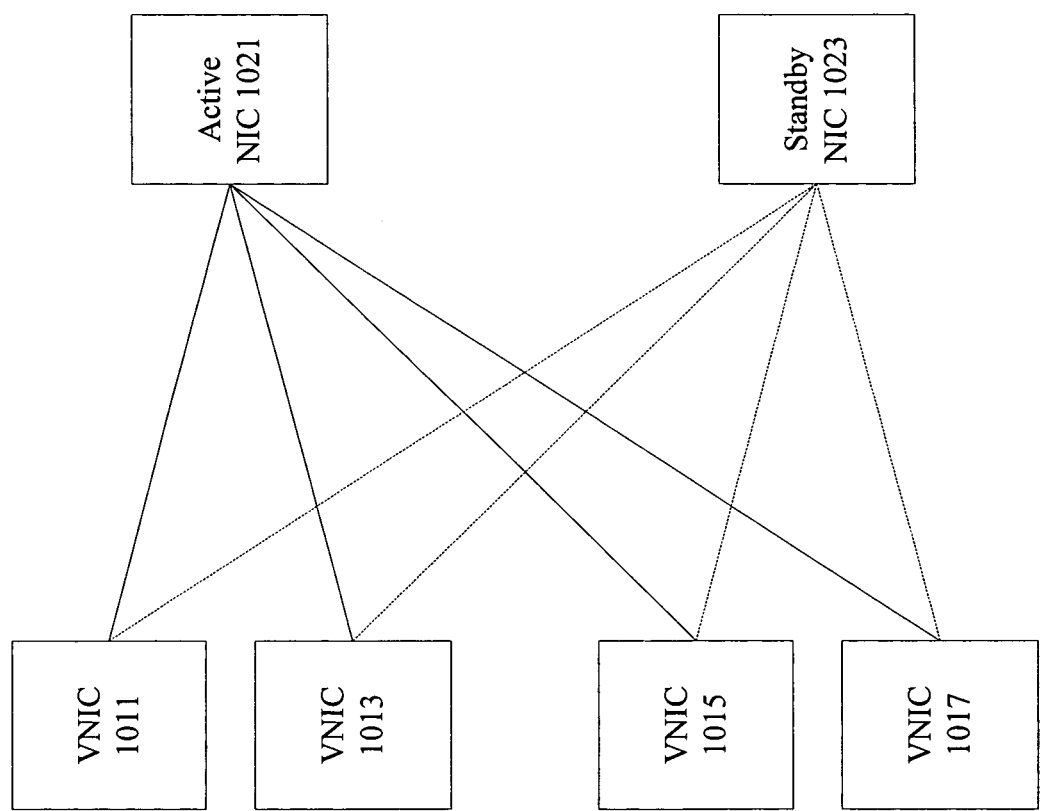
FIG. 10 is a diagrammatic representation showing high availability at a resource virtualization switch.

FIG. 10 is a diagrammatic representation showing one mechanism for providing redundancy at a resource virtualization switch. According to various embodiments, the mechanism does not require any involvement from connected servers. The resource virtualization switch manages the mapping of VNICs to NICs. In one embodiment, VNICs 1011, 1013, 1015, and 1017 are each associated with a server and are all mapped to active NIC 1021. Traffic from the separate servers can be aggregated onto NIC 1021. The control logic on a resource virtualization switch manages the bindings of VNICs to NICs.

According to various embodiments, active NIC 1021 and standby NIC 1023 may have the same configuration including the same MAC address and the same IP address. In other examples, the MAC addresses and the IP addresses may not be the same. Conventional NICs all have globally unique MAC addresses. Manufacturers of NICs request blocks of addresses from a central authority to ensure that no two conventional NICs have the same address to avoid conflicts. However, the VN chip of the present invention allows multiple NICs with the same IP and MAC addresses. Conflicts are avoided because one of the NICs with the same MAC and IP addresses is held inactive.

The control logic associated with the resource virtualization switch monitors the active NIC 1021. In one embodiment, failover is initiated if heartbeat signals are not received from an active NIC after a predetermined period of time. Classifier logic tables can be updated to reflect the new binding of VNICs 1011, 1013, 1015, and 1017 to standby NIC 1023. In some cases, the IP and MAC addresses of the active NIC 1021 and the standby NIC 1023 are exactly the same, and the standby NIC 1023 can assume operation of the active NIC seamlessly. In some embodiments, the MAC addresses of the NICs are different.

Protocols such as the address resolution protocol (ARP) can be used to facilitate failover and allow external network entities to learn IP MAC address associations. ARP maps IP network addresses to the hardware addresses. An external network entity broadcasts a packet that requests the identity of the owner of a particular IP address, such as the IP address used by the now failed NIC 1021. The redundant NIC 1023 will check its IP address and respond with its MAC address. The external network entity learns that the IP address is now associated with the NIC with the new MAC address. Communications over the IP network now use the new MAC address of standby NIC 1023. A number of variations to ARP can also be used.

Figure 11:
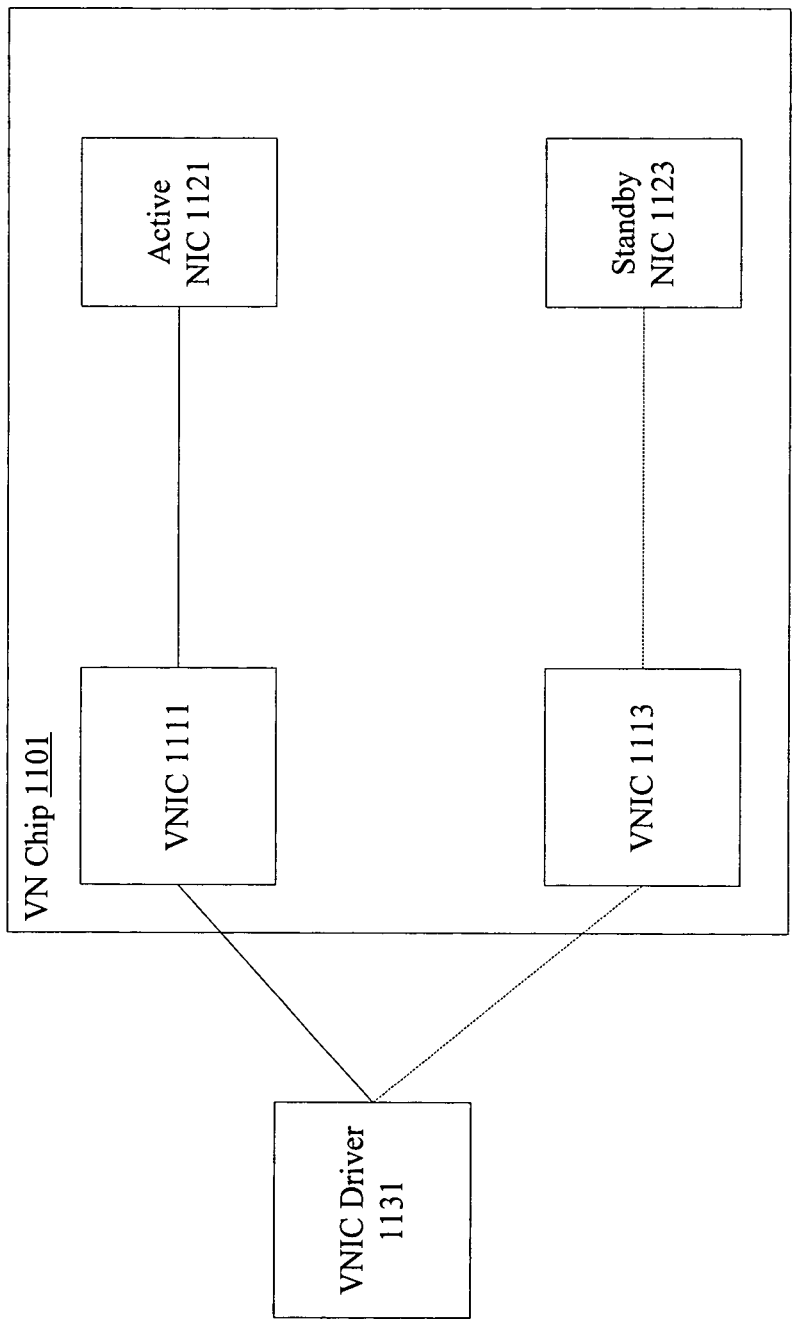
FIG. 11 is a diagrammatic representation showing high availability on a VN chip.

FIG. 11 is a diagrammatic representation showing a server using a VNIC driver that is mapped to multiple VNICs, where each VNIC is bound to a single NIC. Active NIC 1121 and redundant NIC 1123 are bound to VNIC 1111 and VNIC 1113. The server VNIC driver 1131 instantiates a VNIC 1113 for redundant NIC 1123. According to various embodiments, the active NIC 1121 and the redundant NIC 1123 have the same IP address and MAC address configuration but they may terminate on a different port on the resource virtualization switch. When a NIC port fails, the server begins writing into a new buffer ring or descriptor ring so that traffic can be sent out on a new NIC port. Minimum server processor involvement is required and switchover onto the new NIC port is automatic, without the server needing to know about the interface going down. ARP again may be used to speed up learning in neighboring switches.

As noted above, a server is bound to a particular VNIC and uses a buffer/descriptor ring associated with the VNIC to transmit data to a resource virtualization switch. To provide a redundant VNIC to a server, a redundant set of buffer/descriptor queues are provided but left unused. The NIC bound to the redundant VNIC is similarly left unused by the server, although the NIC may be used by a separate server. When failure of a NIC is detected, typically through the failure to receive heartbeat messages, failover is initiated. A new set of buffer/descriptor queues are provided and the server begins to write to the new set of buffer/descriptor queues.

Although a limited number of switchover techniques are described above, it should be recognized that a wide number of variations are possible. By offloading resources such as NICs onto one or more resource virtualization switches and by providing one or more virtual NIC drivers on each server, resources can be dynamically mapped to different servers based on need.

Figure 12:
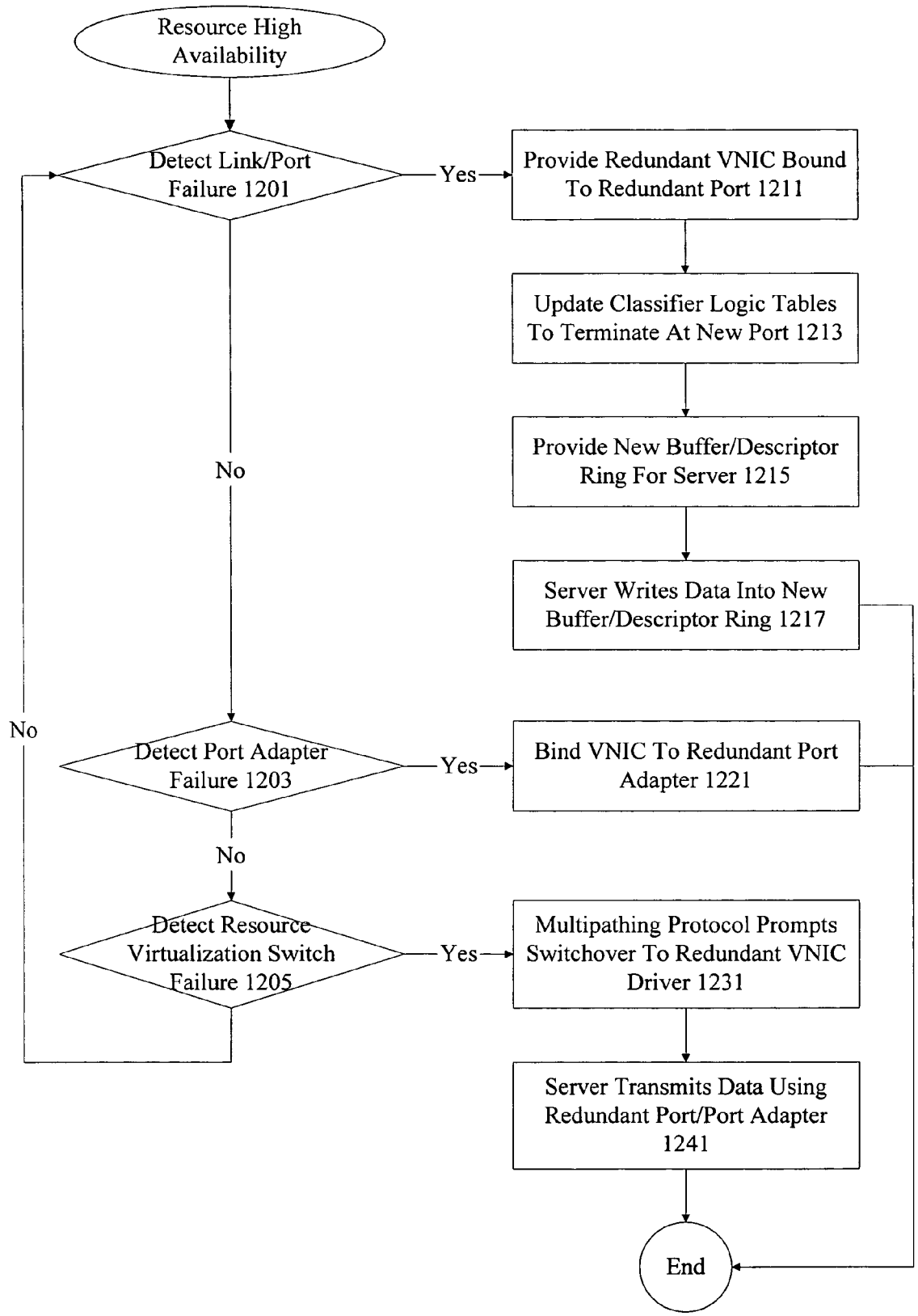
FIG. 12 is a flow process diagram showing a technique for failover at a resource virtualization switch.

FIG. 12 is a process flow diagram showing one technique for providing high availability. High availability is provided to handle link failure, port failure, port adapter failure, I/O bus link failure, or resource virtualization switch failure. At 1201, link or port failure is detected. Link or port failure is typically detected by a VN chip associated with a resource virtualization switch. Detecting link or port failure at a VN chip minimizes the involvement of servers connected to the resource virtualization switch. Link or pot failure is typically detected when a heartbeat message is no longer a received. According to various embodiments, if link or port failure is detected, a redundant VNIC already bound to a redundant port 1211 is provided. According to various embodiments, ARP is used to speed up routing table updates at neighboring network nodes.

At 1213, classifier logic tables are updated to terminate at the new port. New buffer/descriptor rings may also be provided for the connected servers at 1215. As noted above, each VNIC is associated with buffer/descriptor rings that allow I/O bus connected servers to communicate with the resource virtualization switch and external network entities. At 1217, the server begins to write data into the new buffer/descriptor rings. The buffer/descriptor rings also allow the resource virtualization switch to provide data to each connected server over the I/O bus.

Port adapter failure may also be detected at 1203. When a port adapter itself fails, this may be detected by a VN chip associated with a resource virtualization switch or may be detected by the control plane of the resource virtualization switch itself. In some examples, a redundant VNIC bound to a new port adapter can be provided in the same manner as described in 1211 to 1217. However, the VNIC can be also be bound to a redundant port adapter. That is, the same buffer/descriptor ring associated with the currently active VNIC can continue to be used while the new VNIC is dynamically bound to a new port adapter. The new port adapter may have the exact same configuration as the old port adapter. The server can continue writing to the same buffer descriptor ring without knowledge of any port or port adapter failure.

The resource virtualization switch itself may also fail at 1205. If the resource virtualization switch itself fails, a protocol such as a conventional multipathing protocol prompts switchover to a redundant VNIC driver 1231. According to various embodiments, redundant VNIC drivers are coupled to redundant VNICs on separate resource virtualization switches. The redundant resource virtualization switch now handles traffic originally handled by the failed resource virtualization switch. Although packet drops and server involvement is minimized, in some instances, packets may have to be retransmitted using TCP/IP retransmission capabilities.

Figure 13:
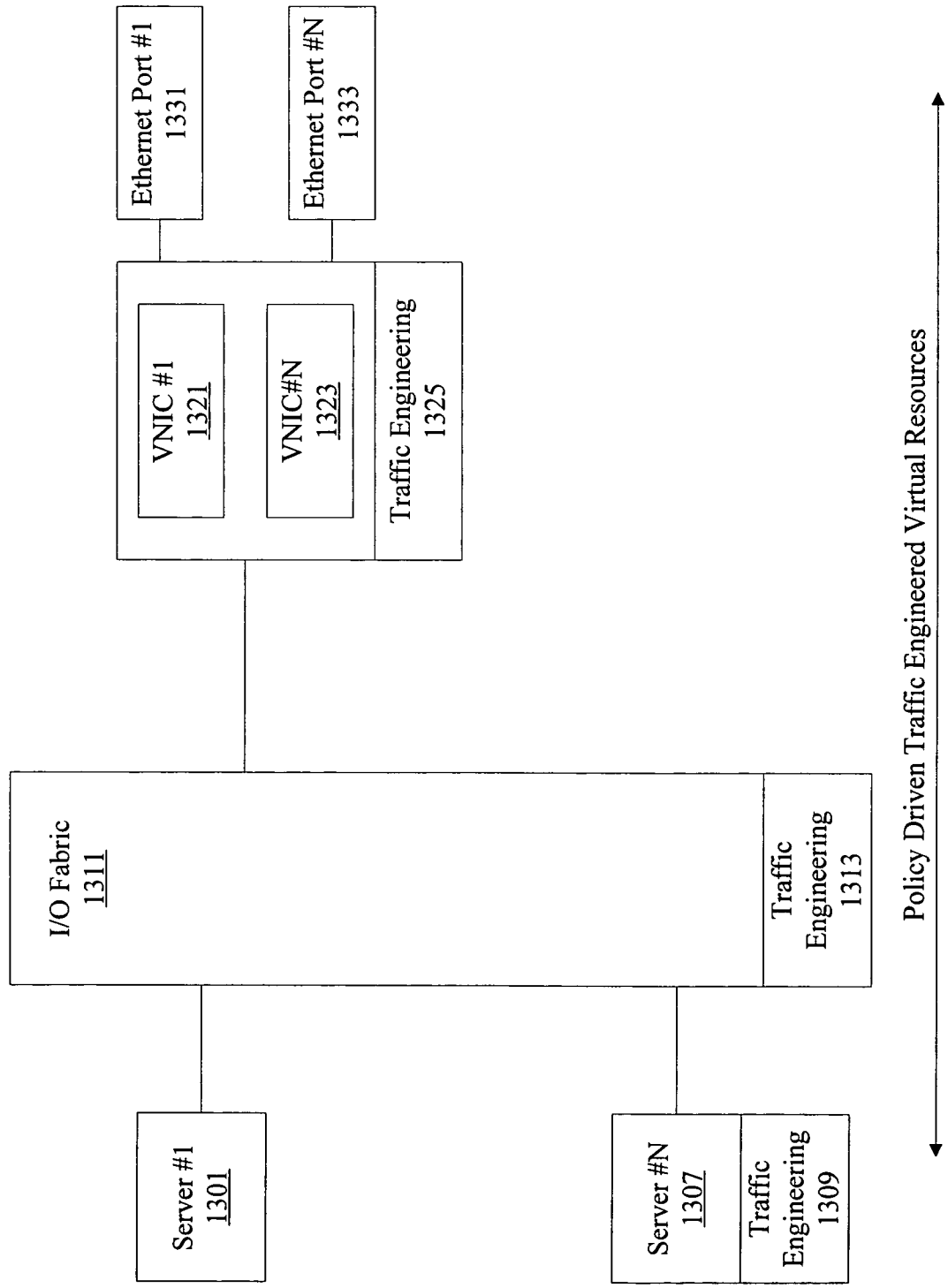
FIG. 13 is a diagrammatic representation showing traffic engineering.

Resource virtualization switches can also support additional features. FIG. 13 is a diagrammatic representation showing policy driven traffic engineering. Traffic engineering can be implemented at VNICs, on a switch fabric such as a PCI Express fabric, and at individual servers on an application aware basis. In conventional implementations, traffic engineering is implemented at various network switches. In some applications, applications themselves can perform some measure of traffic engineering. However, traffic can still be queued or delayed at buses or I/O fabrics because traffic is not conventionally distinguished during transmission on I/O fabrics. In many implementations, traffic flows are distinguished using 5 tuples (transport protocol, source IP address, source port, destination port, and destination address). However, even if traffic flows are distinguished at the network level, traffic is no longer distinguished at I/O buses and congestion for a particular flow can occur.

Consequently, the techniques and mechanisms of the present invention provide traffic engineering outside of the network switch environment. In one embodiment, traffic engineering functionality 1309 is provided at servers 1301 and 1307. Traffic engineering 1313 is also integrated into an I/O fabric 1311. Traffic engineering 1325 is also implemented at VNICs 1321 and 1323. VNICs 1321 and 1323 are connected to Ethernet ports 1331 and 1333 that allow connection to network switches. Consequently, traffic engineering is permitted all the way down to the user application level. Flows can be assigned priorities and policies to allow endpoint to endpoint traffic engineering. Flow counters are used to support charge back based upon user, application and departments. Traffic redirection, passive monitoring, intrusion detection and prevention are all supported. Mapping application flows and providing QoS from the network connection to an application in a server allows support of application service level agreements. It should be noted that an individual server can also be a guest operating system or a virtual machine. Virtual resources connecting servers to an external network can also be provisioned based on policy considerations. PCI Express resources such as bus bandwidth and latency can also be provisioned based on policy considerations.

Figure 14:
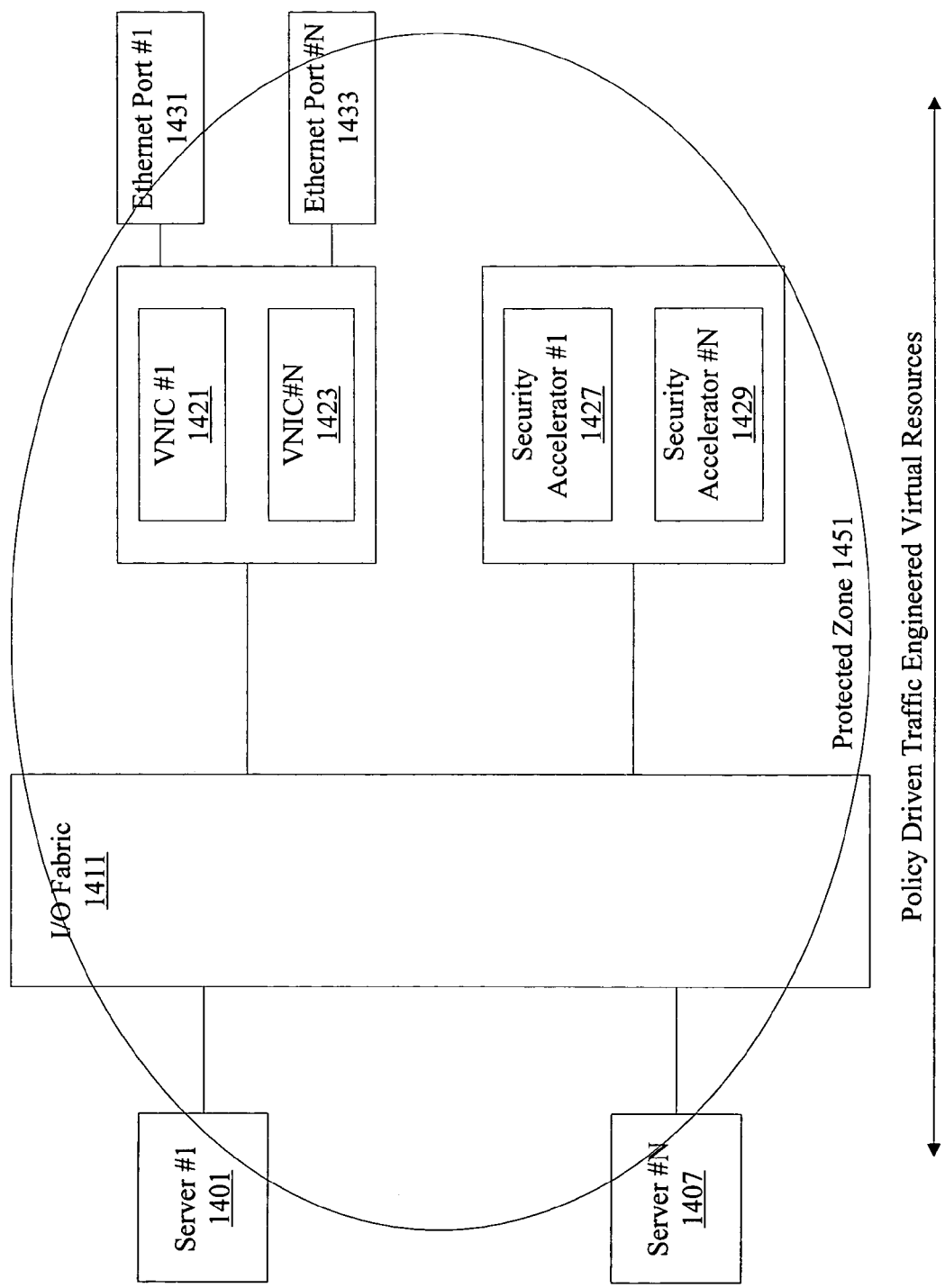
FIG. 14 is a diagrammatic representation showing implementation of security.

FIG. 14 shows another feature that can be implemented using the techniques and mechanisms of the present invention. In many conventional implementations, security accelerators are provided at individual network switches. Security protocols such as Secure Socket Layer (SSL) is implemented for transmissions between network switches. However, transmissions from network switches onto local area networks remain unencrypted. Clear text transmission of data in local area networks is acceptable in some applications but not acceptable in others. Some system administrators are forced to provide security or cryptography accelerators on individual servers. However, providing individual security accelerators on individual servers is expensive. Consequently, the techniques and mechanisms of the present invention envision providing shared security accelerators on a resource virtualization switch to allow secure transmissions even within a local area network without having to provide a security accelerator for every single server. A security accelerator can allow implementation of protocols such as SSL.

In one embodiment, security accelerators 1427 and 1429 are provided with VNICs 1421 and 1423 in a resource virtualization switch. Servers 1401 and 1407 are connected to an I/O fabric 1411. VNICs 1421 and 1423 are connected to Ethernet ports 1431 and 1433 that allow connection to network switches. However, communications within the protected zone 1451 are secure because servers 1401 and 1407 have access to security accelerators 1427 and 1429. Consequently, end to end security is provided by protecting information locally as well as externally at network switches.

In addition, although exemplary techniques and devices are described, the above-described embodiments may be implemented in a variety of manners, media, and mechanisms. For instance, instructions and data for implementing the above-described invention may be stored on a disk drive, a hard drive, a floppy disk, a server computer, or a remotely networked computer. Hardware used to implement various techniques may be embodied as racks, cards, integrated circuited devices, or portions of semiconductor chips. Accordingly, the present embodiments are to be considered as illustrative and not restrictive, and the invention is not to be limited to the details given herein, but may be modified within the scope and equivalents of the appended claims.

What is claimed is:

1. A resource virtualization switch, comprising:
    an I/O bus switch connected to a plurality of external servers through a plurality of I/O bus ports, each of the plurality of external servers comprising a separate memory address space, the plurality of external servers including a first server running a first application and a second server running a second application;
    a plurality of network interface cards (NICs) connected to a PCI-Express bus switch;
    a virtual network chip of a server platform connected to the plurality of I/O bus ports of the I/O bus switch and the plurality of NICs, wherein the plurality of NICs are accessible to the plurality of external servers as virtual NICs (VNICs) through the virtual network chip of the server platform, wherein a plurality of VNICs are assigned to the first application to allow for path redundancy in the event a particular NIC fails;
    a processor subsystem configured to initialize an internet protocol (IP) network connection through a first NIC regardless of whether any of the plurality of external servers are connected to the resource virtualization switch.

2. The resource virtualization switch of claim 1, wherein the first application accesses a particular VNIC as though the first application is accessing a particular NIC included in the first server.

3. The resource virtualization switch of claim 1, wherein the first application is operable to access the plurality of VNICs for load sharing.

4. The resource virtualization switch of claim 1, further includes a plurality of host bus adapters (HBAs).

5. The resource virtualization switch of claim 4, wherein the plurality of HBAs are accessible to the plurality of external servers as virtual HBAs (VHBAs).

6. The resource virtualization switch of claim 5, wherein the second application accesses a particular VHBA as though the second application is accessing a particular HBA included in the second server.

7. The resource virtualization switch of claim 4, wherein the first server includes a first virtual NIC driver and a second virtual NIC driver, wherein the first and second virtual NIC drivers are operable to access a plurality of NICs for redundancy and load sharing.

8. The resource virtualization switch of claim 7, wherein the first and second virtual NIC drivers support the creation of interface groups used for multipathing.

9. The resource virtualization switch of claim 1, wherein the virtual network chip comprises a buffer manager, wherein the buffer manager manages data in a memory associated with the virtual network chip.

10. The resource virtualization switch of claim 9, wherein the virtual network chip further comprises a queue manager, wherein the queue manager manages descriptors for the data including a reference to a memory location for the data, a length of the data, a source port for the data, and a multicast count of the data.

11. The resource virtualization switch of claim 10, wherein the virtual network chip further comprises classifier logic, wherein the classifier logic identifies information including a packet destination server and priority for incoming data.

* * * * *

UNITED STATES PATENT AND TRADEMARK OFFICE
CERTIFICATE OF CORRECTION

PATENT NO. : 8,677,023 B2 Page 1 of 1
APPLICATION NO. : 11/145698
DATED : March 18, 2014
INVENTOR(S) : Venkataraghavan et al.

It is certified that error appears in the above-identified patent and that said Letters Patent is hereby corrected as shown below:

In the Specification

In column 10, line 20-21, delete "interfacse" and insert -- interfaces --, therefor.

Signed and Sealed this
Eighth Day of July, 2014

Michelle K. Lee
*Deputy Director of the United States Patent and Trademark Office*